(12) United States Patent
Lee et al.

(10) Patent No.: US 10,707,481 B2
(45) Date of Patent: Jul. 7, 2020

(54) STABLE SILICON-IONIC LIQUID INTERFACE LITHIUM-ION BATTERIES

(71) Applicant: The Regents of the University of Colorado, a body corporate, Denver, CO (US)

(72) Inventors: Se-Hee Lee, Denver, CO (US); Jerry Martin, Arvada, CO (US); Vinay Bhat, Arvada, CO (US); Daniela Molina Piper, Denver, CO (US); Tyler Evans, Denver, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 22 days.

(21) Appl. No.: 15/522,256

(22) PCT Filed: Oct. 30, 2015

(86) PCT No.: PCT/US2015/058453
§ 371 (c)(1),
(2) Date: Apr. 26, 2017

(87) PCT Pub. No.: WO2016/070120
PCT Pub. Date: May 6, 2016

(65) Prior Publication Data
US 2017/0338474 A1 Nov. 23, 2017

Related U.S. Application Data

(60) Provisional application No. 62/072,957, filed on Oct. 30, 2014.

(51) Int. Cl.
*H01M 4/36* (2006.01)
*H01M 4/38* (2006.01)
(Continued)

(52) U.S. Cl.
CPC .......... *H01M 4/366* (2013.01); *H01M 4/134* (2013.01); *H01M 4/386* (2013.01); *H01M 4/622* (2013.01);
(Continued)

(58) Field of Classification Search
CPC ........ H01M 10/00–10/60; H01M 4/02; H01M 4/04; H01M 4/13; H01M 2004/021–2004/026
(Continued)

(56) References Cited

U.S. PATENT DOCUMENTS 5,240,794 A    8/1993  Thackeray et al.
7,618,678 B2   11/2009 Mao et al.
(Continued)

FOREIGN PATENT DOCUMENTS

JP    2014139920 A    7/2014
WO    2016070120 A1   5/2016

OTHER PUBLICATIONS

D.M. Piper, T.A. Yersak, S. Son, S.C. Kim, C.S. Kang, K.H. Oh, C. Ban, A.C. Dillon, S. Lee, Conformal Coatings of Cyclized-PAN for Mechanically Resilient Si nano-Composite Anodes, Advanced Energy Materials, vol. 3, Issue 6, pp. 697-702 (Year: 2013).*
(Continued)

*Primary Examiner* — Bach T Dinh
(74) *Attorney, Agent, or Firm* — Holzer Patel Drennan

(57) ABSTRACT

The disclosure includes a composition of matter including a film formed on substantially all nSi-cPAN particles included in an electrode, the film including fluorine, oxygen, sulfur, carbon and lithium.

8 Claims, 27 Drawing Sheets

(51) Int. Cl.

| | |
|---|---|
| *H01M 10/0525* | (2010.01) |
| *H01M 4/62* | (2006.01) |
| *H01M 10/0566* | (2010.01) |
| *H01M 4/134* | (2010.01) |
| *H01M 4/525* | (2010.01) |
| *H01M 4/505* | (2010.01) |
| *H01M 4/131* | (2010.01) |
| *H01M 4/02* | (2006.01) |

(52) U.S. Cl.
 CPC ... *H01M 10/0525* (2013.01); *H01M 10/0566* (2013.01); *H01M 4/131* (2013.01); *H01M 4/505* (2013.01); *H01M 4/525* (2013.01); *H01M 2004/021* (2013.01); *H01M 2300/0045* (2013.01)

(58) Field of Classification Search
 USPC .......................................... 429/1–11, 65–255
 See application file for complete search history.

(56) References Cited

U.S. PATENT DOCUMENTS

| | | | |
|---|---|---|---|
| 8,158,282 B2 | 4/2012 | Zhamu et al. | |
| 2005/0136330 A1* | 6/2005 | Mao | C25D 17/10 429/231.95 |
| 2008/0083901 A1 | 4/2008 | Park | |
| 2009/0202913 A1 | 8/2009 | Sakaguchi et al. | |
| 2010/0159334 A1* | 6/2010 | Kashima | H01M 2/162 429/231.95 |
| 2012/0059129 A1* | 3/2012 | He | C08F 8/34 525/344 |
| 2012/0082903 A1 | 4/2012 | Zhang et al. | |
| 2012/0316716 A1 | 12/2012 | Odani et al. | |
| 2013/0045420 A1 | 2/2013 | Biswal et al. | |
| 2014/0087250 A1 | 3/2014 | Coowar et al. | |
| 2014/0106215 A1* | 4/2014 | Nanda | H01M 10/0525 429/211 |
| 2014/0186701 A1* | 7/2014 | Zhang | H01M 4/133 429/211 |
| 2014/0193712 A1 | 7/2014 | Yushin et al. | |
| 2018/0006294 A1 | 1/2018 | Lee et al. | |

OTHER PUBLICATIONS

International Preliminary Report on Patentability for Application No. PCT/US2015/058453 filed Oct. 30, 2015, dated May 2, 2017 by International Bureau of WIPO, 8 pages.

Piper, Daniela Molina et al., "Stable silicon-ionic liquid interface for next-generation lithium-ion batteries," Nature Communications, vol. 6, Feb. 25, 2015, 10 pages.

Fang, S. et al., "High performance three-dimensional GE/cyclized-polyacrylonitrile thin film anodes prepared by RF magnetron sputtering for lithium ion batteries," Journal of Materials Science, Mar. 2014, vol. 49, Issue 5, pp. 2279-2285, on-line Dec. 12, 2013, 9 pages.

International Search Report and Written Opinion for PCT/US2016/015455, dated Jun. 17, 2016, U.S. International Search Authority, Applicant: SilLion, Inc., 12 pages.

Piper, Daniela Molina, et al., "Hierarchical Porous Framework of Si-Based Electrodes for Minimal Volumetric xpansion," Advanced Materials, vol. 26, Jun. 13, 2014, pp. 3520-3525, Wiley Online Library.

Supplementary European Search Report for European Patent Application No. 167441338.5, dated May 3, 2018 from the European Patent Office, Applicant: The Regents of the University of Colorado, 8 pages.

International Search Report and Written Opinion for PCT/US2015/058453 filed Oct. 30, 2015, dated Jan. 14, 2016, European Patent Office International Search Authority, 11 pages.

Liu, XH et al. "Size-dependent fracture of silicon nanoparticles during lithiation," ACS Nano. 2012, vol. 6 No. 2; abstract; pp. 1522, 1528.

Wang, C. et al., "Self-healing chemistry enables the stable operation of silicon microparticle anodes for high-energy ithium-ion batteries," Nature Chemistry, 2013, vol. 5 No. 12, 7 pages.

Examination Report / Communication pursuant to Article 94(3) EPC from the European Patent Office for European Patent application No. 15794013.1, dated Sep. 20, 2018, Applicant: The Regents of the University of Colorado, 5 pages.

\* cited by examiner

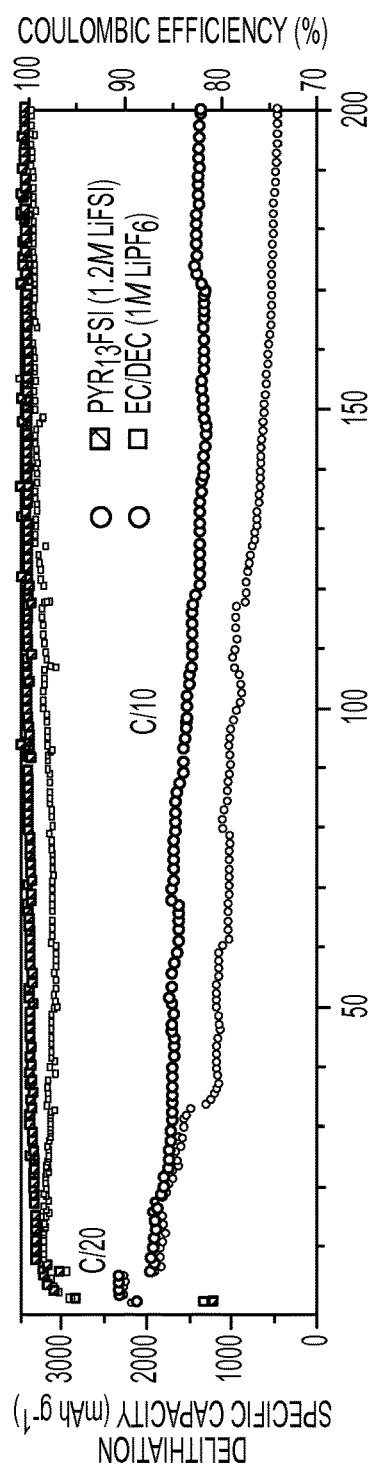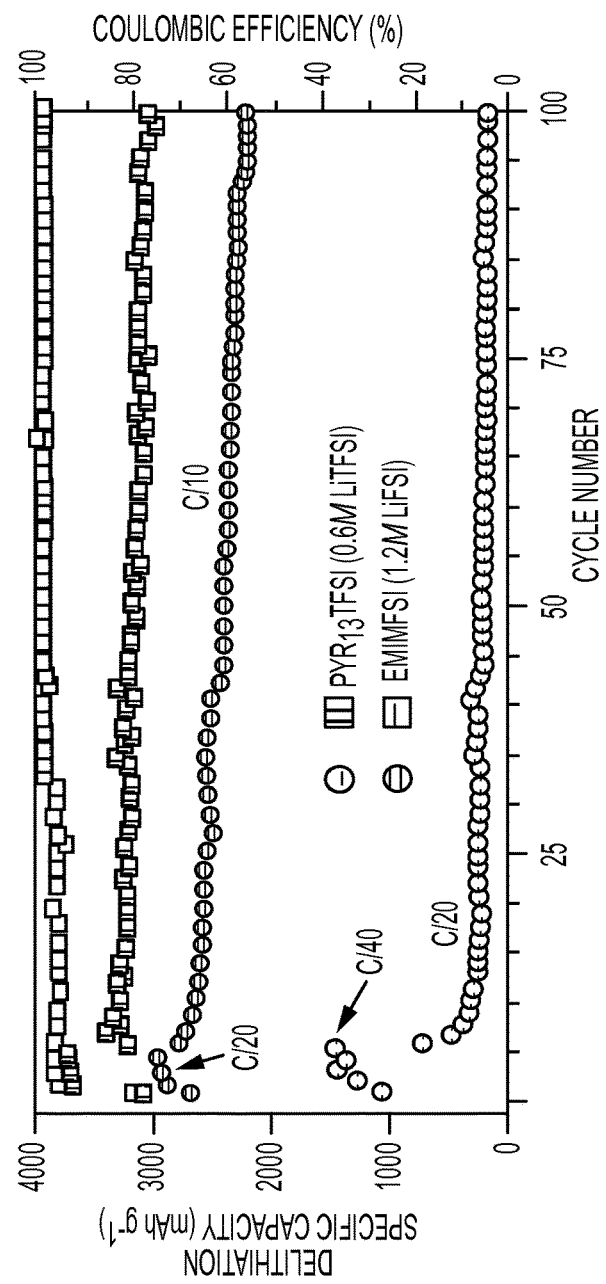
FIG. 1A
FIG. 1B

STABLE SILICON-IONIC LIQUID INTERFACE LITHIUM-ION BATTERIES

PRIORITY OF INVENTION

This application claims priority to U.S. Patent Application No. 62/072,957 that was filed on 30 Oct. 2014. The entire content of this application is hereby incorporated herein by reference.

STATEMENT REGARDING FEDERALLY SPONSORED RESEARCH

This invention was made with government support under grant number IIP1152040 awarded by the National Science Foundation. The government has certain rights in the invention.

FIELD

The disclosure relates to energy storage devices. More particularly, the disclosure describes lithium-ion batteries.

BACKGROUND

Silicon's volume expansion during lithiation make its use as a battery material problematical. While the commercialized graphite electrode expands roughly 10-13% during lithium intercalation, silicon's expansion amounts to nearly 300%, generating structural degradation and instability of the solid-electrolyte interphase. Such instabilities ultimately shorten the battery life to inadequate levels, cause breaking of conduction channels, active material isolation, continuous solid-electrolyte interphase reformation, and a mechanically unstable solid-electrolyte interface.

The solid-electrolyte interphase layer forms on the anode surface through reductive decomposition of the electrolyte during charging of the battery. Silicon anodes suffer from a dynamic solid-electrolyte interphase that must reform each cycle as expansion during lithiation causes the layer to break. Formation of the solid-electrolyte interphase consumes $Li^+$ and depletes electrolyte during every cycle. In contrast to half-cells, which utilize a Li metal counterelectrode with an effectively unlimited supply of $Li^+$, full-cells have a limited supply of $Li^+$ provided by the cathode. It follows that the continuous breaking and reforming of the solid-electrolyte interphase layer quickly destroys the cell's cycling performance.

Alternative electrolyte compositions and active material surface treatments have been studied in the effort to enhance SEI formation on high-capacity anode materials and improve half-cell CEs. In spite of these efforts, the CEs achieved throughout cycling are still insufficient for a long-lasting Si-based full-cell or the methods employed to manufacture the full-cells introduce large excesses of $Li^+$ (>200%) into the system that camouflage its true performance. In the effort to design next generation electrolyte materials, room temperature ionic liquids (RTILs or ILs) are of interest due to their low volatilities, negligible vapor pressures, thermal stabilities, high voltage stability windows, and sufficient ionic conductivities. RTILs, particularly those consisting of the pyrrolidinium ($PYR_1^{n+}$) or 1-ethyl-3-methyl-imidazolium ($EMIM^+$) cation and the bis(trifluoromethanesulfonyl)imide ($TFSI^-$) or bis(fluorosulfonyl)imide ($FSI^-$) anion, are cathodically stable with popular negative electrode materials including Si. A clear understanding of the electrochemical properties and interfacial chemistries of these materials has not yet been developed. Little work has been dedicated to the study of the compatibility between RTIL electrolytes and Si-based nanocomposite electrodes, with published work in this field, to date, investigating Si-RTIL systems in thin film type electrodes.

For these and other reasons there is a need for battery materials capable of providing high energy-density and long cycling life at low cost.

BRIEF DESCRIPTION OF THE DRAWINGS

FIG. 1(A) shows capacities and coulombic efficiencies of nSi-cPAN electrode in $PYR_{13}FSI$ (1.2M LiFSI) and EC/DEC (1M $LiPF_6$).

FIG. 1(B) shows capacities and coulombic efficiencies of nSi-cPAN electrode in $PYR_{13}TFSI$ (0.6M LiTFSI) and EMIMFSI (1.2M LiFSI) electrolyte systems.

DESCRIPTION

A combinatorial approach, one involving a mechanically resilient electrode architecture merged with an electrolyte capable of forming a favorable SEI, is one option to integrate structural integrity with stable interfacial chemistry in a bulk type Si anode. To this end, we have designed a nano-Si-RTIL system that exhibits a highly stable and resilient SEI, providing a solution to the drawbacks of the Si-anode and enabling the long-term operation of a lithium-ion full-cell with a bulk type nano-Si-based anode. A "nanosilicon based electrode" is an electrode which contains silicon active material with a particle size/diameter in the nanometer scale (1-500 nm). Through a systematic and comprehensive experimental matrix, we have studied the composition and structure of the SEI formed by an FSI$^-$-based IL on our previously reported cyclized-polyacrylonitrile (cPAN)-based Si nanocomposite architecture (nSi-cPAN). Using experimental and theoretical data, we propose a mechanism for the formation of the SEI at the nano-Si-RTIL interface and discuss the importance of CE in half-cell configurations. Most notably, this study is highlighted by the groundbreaking demonstration of the highly reversible cycling of a nSi-cPAN/Li(Ni$_{1/3}$Mn$_{1/3}$Co$_{1/3}$)O$_2$-(L333) full-cell using a PYR$_{13}$FSI (1.2M LiFSI) electrolyte.

Figures 7A, 7B:
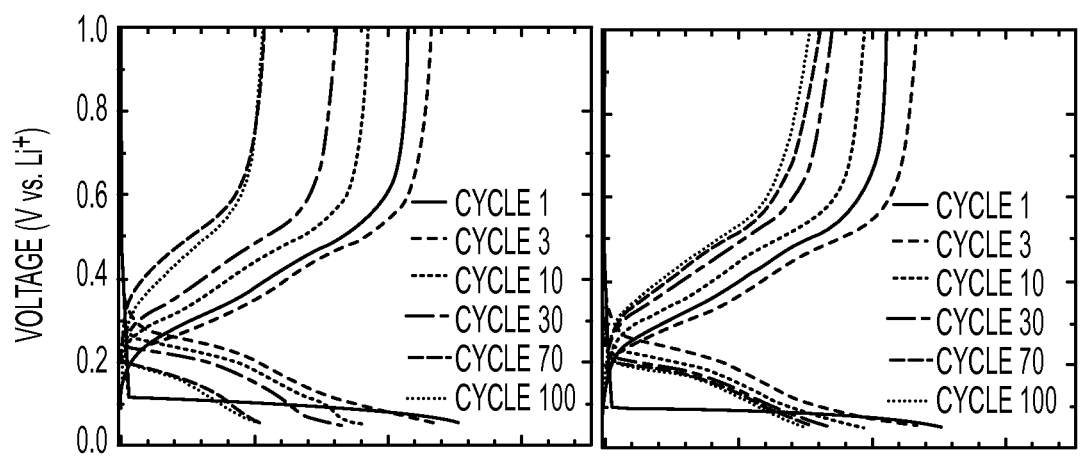
FIG. 7(A) shows a voltage profile of EC/DEC (1M $LiPF_6$) with nSi-cPAN.
FIG. 7(B) shows a voltage profile of $PYR_{13}FSI$ (1.2M LiFSI) with nSi-cPAN.
Figures 7C, 7D:
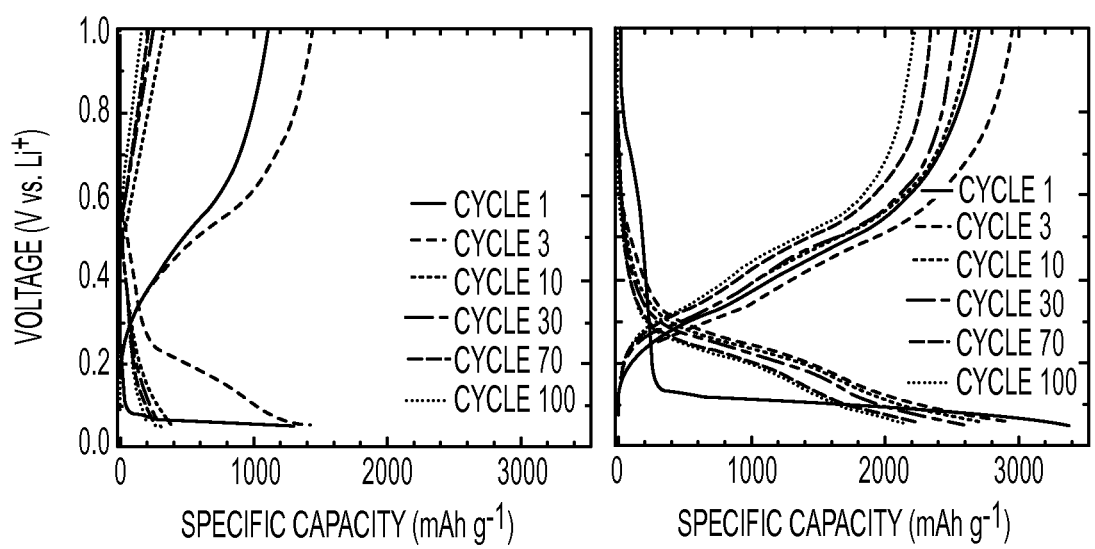
FIG. 7(C) shows a voltage profile of $PYR_{13}TFSI$ (0.6M LiTFSI) with nSi-cPAN.
FIG. 7(D) shows a voltage profile of EMIMFSI (1.2M LiFSI) with nSi-cPAN.

The simple fabrication, scalability, low volume expansion, and structural robustness of the nSi-cPAN architecture make it an ideal candidate to merge with a suitable electrolyte system. In pursuit of a stable Si-electrolyte interface, the nSi-cPAN composite was cycled under galvanostatic conditions in RTILs comprised of cation-anion combinations known for their cathodic stabilities against various negative electrode materials. The cycling performances of the nano-Si-based electrode in RTIL solutions, including PYR$_{13}$FSI (1.2M LiFSI), PYR$_{13}$TFSI (0.6M LiTFSI), and EMIMFSI (1.2M LiFSI), were directly compared to the electrode's performance in the commercial EC/DEC (1M LiPF$_6$) electrolyte. The results of the preliminary cycling study are presented in FIG. 1(A) and FIG. 1(B), demonstrating the strong and unexpected cycling stability of the nSi-cPAN anodes in FSI$^-$-based ILs and their unexpected CE in the PYR$_{13}$FSI system. Cycling was carried out at room temperature in 2032 coin-type half-cells operated between 0.05-1 V (vs. Li/Li+). The high CE manifested in the PYR$_{13}$FSI (1.2M LiFSI) electrolyte stabilizes after 8 cycles, with an average stable CE of 99.945% and a charge capacity retention of 76.7% after 100 cycles (FIG. 1(B)). While exhibiting stable half-cell cycling, the lower average CE (98.451%) observed using EMIMFSI (1.2M LiFSI) electrolyte (FIG. 1(B)) is ascribed to the instability of the EMIM$^+$ cation below 1.5 V (vs. Li/Li$^+$). Such data contrasts that of the cycling behavior of our nSi-cPAN electrode in a conventional organic electrolyte, which maintains only 45.2% of its initial charge capacity after 100 cycles with an average stable CE of 97.824% (FIG. 1(A)) are depicted in FIG. 7.

The high and unexpected CEs of the nano-Si—PYR$_{13}$FSI system are attributed to the formation of a highly stable SEI. We suggest that the breakdown of the ions present in the electrolyte solutions leads to varying SEI compositions dependent on the ionic make-up of the RTILs. We postulate that the interface formed by the decomposition products of the FSI$^-$-based IL mitigates the continuous SEI formation experienced in organic electrolyte, and this proposal is substantiated by the longer cycling life of the nano-Si—PYR$_{13}$FSI half-cell (FIG. 1(A)), achieving an average CE of 99.97% in 200 cycles. Given the distinct incongruity of the nano-Si-cPAN electrode with the TFSI$^-$-based electrolyte, the decomposition mechanisms and SEI compositions resulting from ILs comprised of TFSI and FSI$^-$ were explored using density functional theory (DFT) electronic structure methods.

FIG. 2 shows a decomposition mechanism of FSI-- and TFSI--based ILs on a Li$_{13}$Si$_4$ surface ball and stick models of the A, FSI$^-$ anion B, decomposed FSI radical di-anion, C, TFSI$^-$ anion, and D, decomposed TFSI$^-$ di-anion. DFT simulations of the E, intact PYR$^+$/FSI$^-$ pair on Li$_{13}$Si$_4$, F, decomposed PYR$^+$/FSI$^-$ pair on Li$_{13}$Si$_4$, G, intact PYR$^+$/TFSI$^-$ pair on Li$_{13}$Si$_4$, and H, decomposed PYR$^+$/TFSI$^-$ pair on Li$_{13}$Si$_4$. In E-H excess electrons on FSI$^-$ or TFSI$^-$ are not added explicitly but come from Li$_{13}$Si$_4$. Li, Si, C, O, N, S, and F atoms are depicted as silver, green, grey, red, blue, yellow, and purple spheres, respectively. The PYR$_{13}^+$ cation is shown as a grey line diagram in the background. All panels are optimized geometries except F and H which are AIMD snapshots at T=350 K.

Through a parallel modeling treatment in two different environments, we are able to compare potential SEI formation pathways in ILs containing both anions. The first type of theoretical study consists of cluster-based, localized basis calculations on isolated FSI$^-$ (FIG. 2(A)) and TFSI$^-$ (FIG. 2(C)) anions, mimicking one-electron reduction pathways in a bulk liquid electrolyte. The second study consists of periodic boundary condition simulations of PYR$^+$/FSI$^-$ and PYR$^+$/TFSI$^-$ ion pairs of a Li$_{13}$Si$_4$ slab (010) surface. Similar results are obtained by both modeling treatments, thus we will focus the following analysis on the study of ion pairs on a lithiated silicon surface. A detailed description of the localized basis calculations (first modeling study) is provided below and depicted in FIG. 8. In order to model our electrolyte molecules in direct contact with a pristine anode surface, we first optimize PYR$^+$/FSI$^-$ and PYR$^+$/TFSI$^-$ ion pairs on the Li$_{13}$Si$_4$ surface (FIGS. 2(E) and 2(G), respectively).

The same model surface was previously studied in the context of fluoroethylene carbonate (FEC) decomposition and represents a low-potential anode surface with Si directly exposed to the liquid electrolyte, serving as an electron source that can readily reduce electrolyte molecules in its vicinity.

Figure 2A:
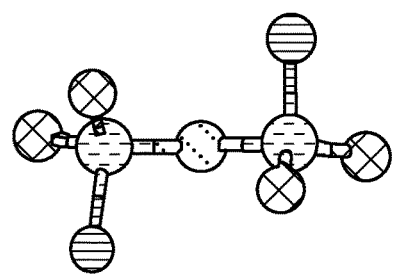
FIGS. 2(A), 2(B), 2(C), 2(D), 2(E), 2(F), 2(G), and 2(H) show illustrations of a decomposition mechanism on a $Li_{13}Si_4$ surface.
Figure 2B:
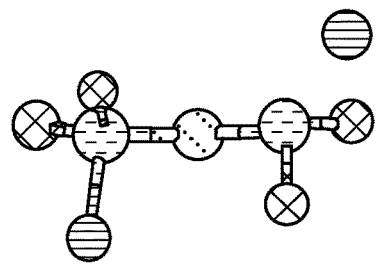
Figure 2C:
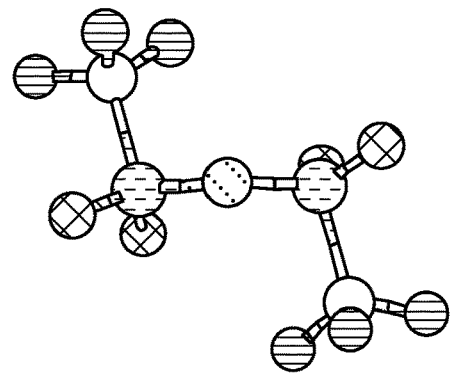
Figure 2D:
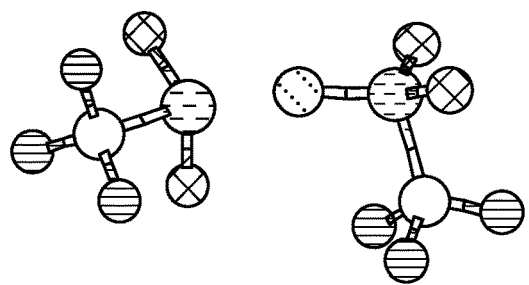
Figure 2E:
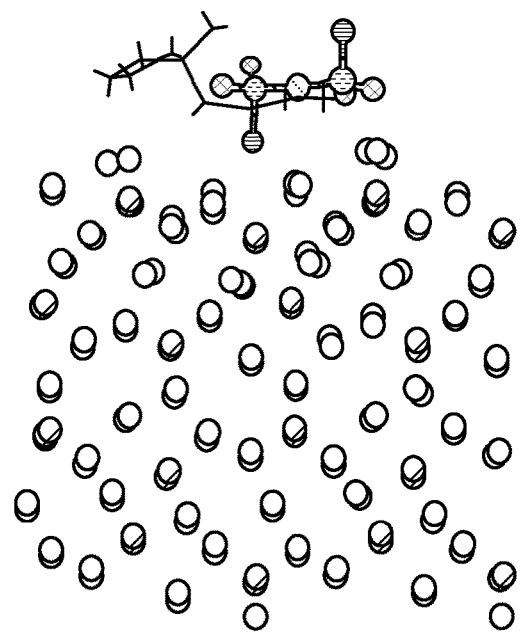
Figure 2F:
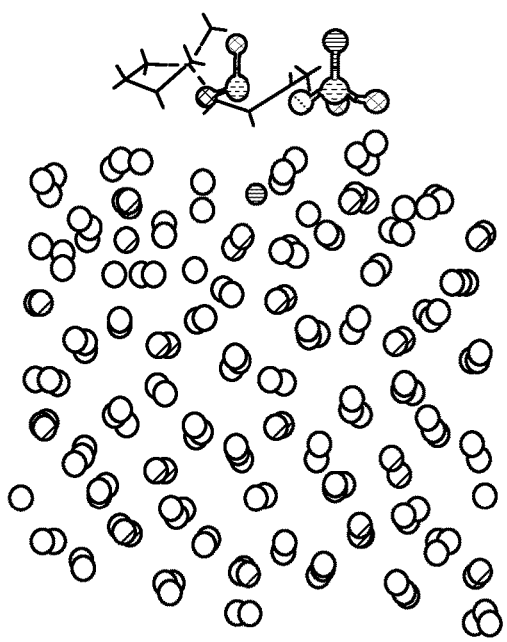
Figure 2G:
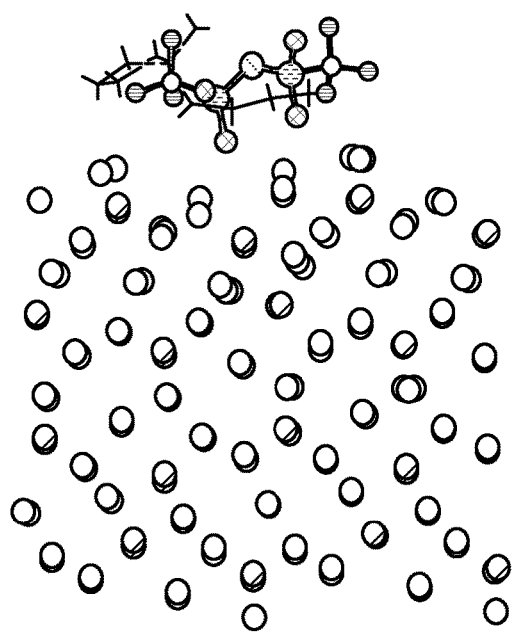
Figure 2H:
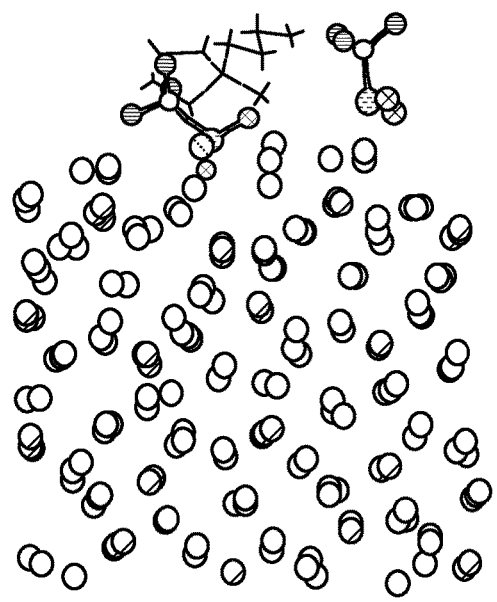
Figure 3A:
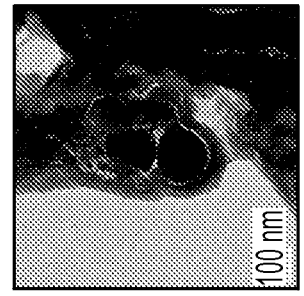
FIGS. 3(A), 3(B), 3(C), 3(D), 3(E), 3(F), and 3(G) show microimages of solid-electrolyte interphase compositions in a $Si-PYR_{13}FSI$ system.
Figure 3B:
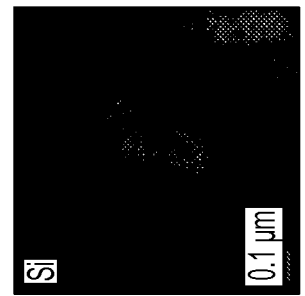
Figure 3C:
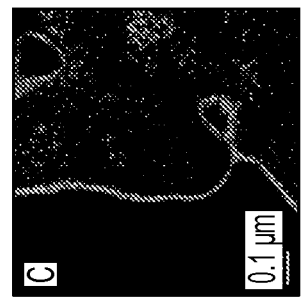
Figure 3D:
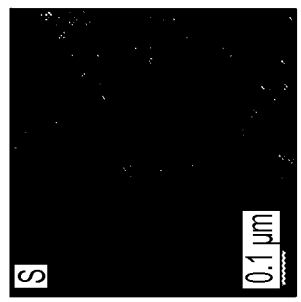
Figure 3E:
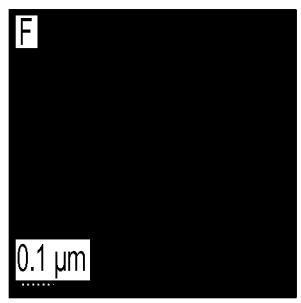
Figure 3F:
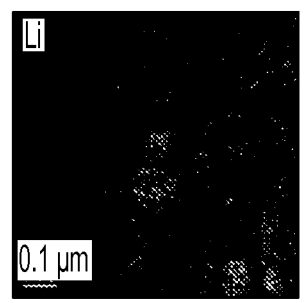
Figure 3G:
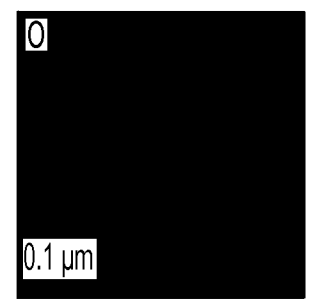

After the geometric optimizations, which do not lead to chemical reaction, ab initio molecular dynamics (AIMD) simulations were initiated at 350 K. The FSI anion rapidly decomposes within 1.2 ps (FIG. 2(F)). The S—F bond breaks first, releasing F$^-$ as shown in FIG. 2(B), followed by detachment of the SO$_2$ group which is expected to undergo further reaction with the anode surface and absorb a second electron. This rapid reaction cascade is reminiscent of the FSI$^-$ reactions predicted on Li metal surfaces. TFSI$^-$ proves to be much less reactive than FSI$^-$, staying intact on the Li$_{13}$Si$_4$ surface for 21 ps at which point it decomposes (FIG. 2(D)). Neither of the two resulting fragments have a net magnetic moment, indicating that a two-electron reduction has occurred and formed SO$_2$CF$_3^-$ and NSO$_2$CF$_3^{2-}$ on the electrode surface (FIG. 2(H)). PYR$_{13}^+$ remains inert throughout all of the aforementioned simulations.

To summarize our modeling study, we find that FSI$^-$ and TFSI$^-$ undergo quite different decomposition mechanisms upon electrochemical reduction. FSI$^-$ rapidly releases F$^-$, most likely forming LiF in the SEI, while TFSI forms different products at much slower timescales. While some of the latter reduced fragments may eventually yield F$^-$, slower F$^-$ release, similar to the slow PF$_6^-$ decomposition by organic electrolyte, is expected by TFSI$^-$. We speculate that the fast release of F$^-$ may be correlated to the high cycling performance exhibited by the nano-Si—PYR$_{13}$FSI system. This argument dovetails with earlier modeling studies of FEC decomposition, which show that FEC also rapidly releases F$^-$ to form LiF, as well as empirical data showing favorable Si half-cell cycling behavior when using FEC as an electrolyte additive in organic carbonate-based electrolyte.

By using electron energy loss spectroscopy (EELS) to study the elemental composition of the surface of nSi-cPAN particles during cycling (16th delithiation), we confirm our DFT predictions and gain insight into the elemental constitution of the proposed SEI. FIG. 3 displays high-resolution transmission electron microscopy (HRTEM) images of the cycled/delithiated nSi-cPAN cross-section (FIG. 3(A)) with EELS mapping of silicon (FIG. 3(B)), carbon (FIG. 3(C)), sulfur (FIG. 3(D)), fluorine (FIG. 3(E)), lithium (FIG. 3(F)), and oxygen (FIG. 3(G)), defining the elemental constitution and favored nucleation sites of the SEI formed. The well-defined silhouette of F coating the surface of the Si particles, in combination with the presence of Li, substantiates the LiF-based SEI found in our DFT simulations. Moreover, the clear mapping of O over the cPAN surface coating and evidence of S correlates with previously determined FSI$^-$ breakdown-products, such as LiOH and SO$_2$. Similar analysis of a conventional Si-based electrode cycled in conventional, organic electrolyte shows no specific adherence of electrolyte decomposition products around the cycled Si particles (FIG. 9).

In order to investigate the formation mechanism of the proposed SEI on the nSi-cPAN electrode, we turn to an examination of the mass changes on this interface during the first charge-discharge cycle using an electrochemical quartz crystal microbalance (EQC M). By monitoring mass increases and decreases on the electrode in real time during the first cycle, at which time the SEI forms its foundational structure, we gain an appreciation for the fragility of this interface in the conventional, organic electrolyte based system while further showing the mechanical resilience of the nano-Si-RTIL interface.

Figure 4A:
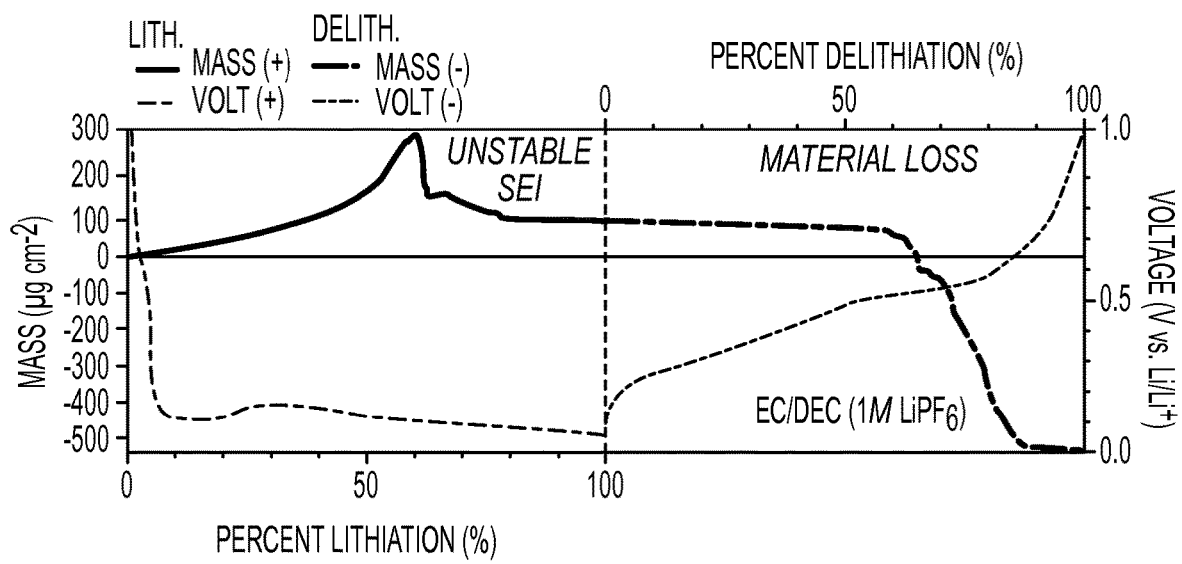
FIGS. 4(A) and 4(B) show mass changes on an nSi-cPAN electrode during the first charge-discharge cycle.
Figure 4B:
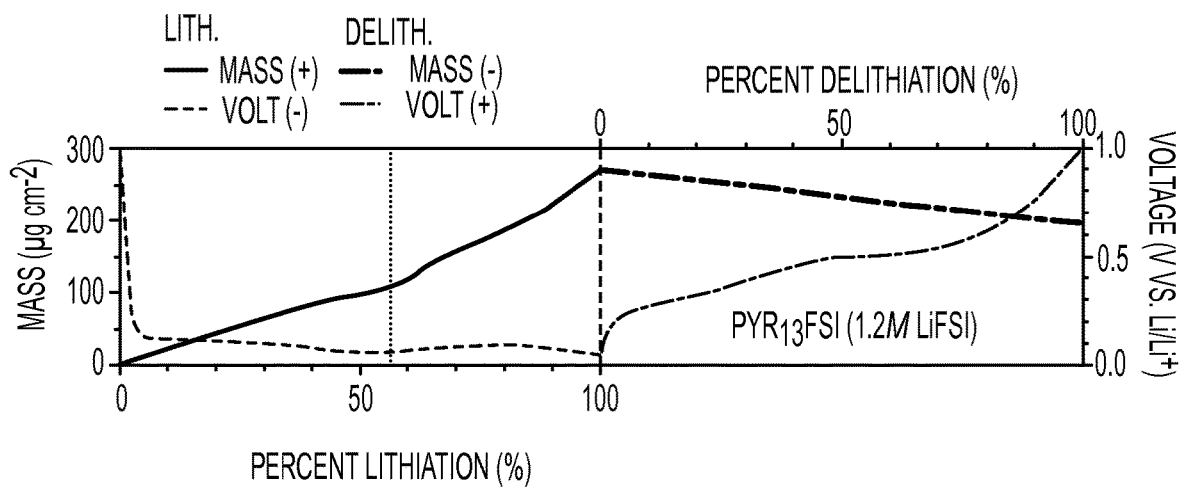

FIG. 4 shows mass changes on the nSi-cPAN electrode during the first charge-discharge cycle. EQCM massograms obtained during the initial SEI formation cycle for the nSi-cPAN electrodes cycled in A, conventional organic electrolyte and B, PYR$_{13}$FSI (1.2M LiFSI) electrolyte, along with the voltage traces corresponding to each system. More particularly, FIG. 4 conveys EQCM massograms for the nSi-cPAN initial formation cycle in both organic electrolyte (FIG. 4(A)) and FSI$^-$-based IL (FIG. 4(B)). Both systems reveal two very distinct behaviors during lithiation, as alluded to in our modeling study. The gradual rise in mass of about 43 µg cm$^{-2}$ during the initial 20% of lithiation in both systems corresponds to the uptake of lithium by cPAN, other non-faradaic processes, and initial alloying of Li with Si.

Subsequently, the electrodes undergo rapid mass changes, attributed mainly to the decomposition of electrolyte and deposition of decomposition products on the electrode-electrolyte interface. The onset of these rapid mass changes are visible in the voltage trace of each system through the "potential overshoot" phenomenon, a known artifact of electrolyte decomposition in EQCM experiments. The onset of this rapid mass change occurs earlier (20.5% lithiation) and at a significantly higher rate (reaching 73 g mol$^{-1}$ of e$^-$ at 46.1% lithiation) in conventional organic electrolyte. Mass change per mol of electrons (m.p.e., g mol$^{-1}$ of e$^-$) was extracted from data in FIG. 10. This is owed to the lower electrochemical stability of the conventional organic electrolyte as compared to the PYR$_{13}$FSI system, which has a voltage stability window of 7.31 V. The higher average m.p.e. in the conventional electrolyte system, along with the very slow F$^-$ release during EC/DEC (1M LiPF$_6$) decomposition suggests the formation of an SEI composed primarily of broken-down organic molecules. Conversely, the controlled mass gains, lower average m.p.e. (reaching 25 g mol$^{-1}$ of e after 56% lithiation), and fast F$^-$ release, as demonstrated earlier in this work, of the PYR$_{13}$FSI (1.2M LiFSI) electrolyte throughout lithiation substantiates our prediction of the formation of an SEI comprised of small inorganic molecules such as LiF.

After reaching a critical mass of 282 µg cm$^{-2}$, the mass of the Si-conventional organic electrolyte system crashes. The crash in mass could be caused by a number of factors, including the severe volume expansion known to occur in this system causing breakage of the electrode matrix, and the build-up and rupturing of an unstable interfacial layer. During delithiation, contraction of the nSi-cPAN composite leads to further breakage of the electrode matrix and material loss. The inability of this system to exhibit stable mass changes corresponds to the incompatibility of Si with conventional electrolyte. Contrastingly, the nano-Si-RTIL system massogram exhibits more gradual mass growth and loss, with approximately 73% of the mass gained during initial lithiation remaining after delithiation. We attribute this behavior to the irreversible formation of a stable interfacial layer on the nano-Si electrode, manifesting stable cycling and high CEs throughout an impressive cycling life.

While the theoretical and experimental data described provide insight into the formation mechanism and composition of the proposed SEI, we turn to a more comprehensive imaging examination to develop a direct understanding of the morphological effects of the $PYR_{13}FSI$ electrolyte on our nano-Si-based electrode.

FIG. 5 shows microstructure of nSi-cPAN and morphological effects of $PYR_{13}FSI$ IL on anode. (A), EELS elemental mapping of carbon and silicon and (B), TEM micrograph of the pristine nSi-cPAN electrode reveal a thin, conformal coating of PAN on the nano-Si particles throughout the uncycled composite. (C), (D), FESEM images of electrode cross-sections before (C) and after (D) initial lithiation showing an electrode volume expansion of only 17%. E-H, TEM micrographs of fully lithiated (E, F) and 16th delithiated (G, H) nSi-cPAN electrodes showing no mechanical deficiencies or significant morphological changes.

Figure 5A:
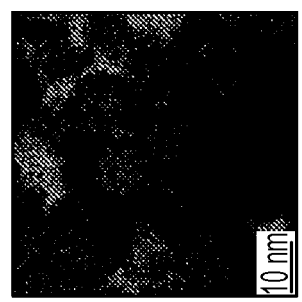
FIGS. 5(A), 5(B), 5(C), 5(D), 5(E), 5(F), 5(G), and 5(H) show microstructure images of an anode.
Figure 5B:
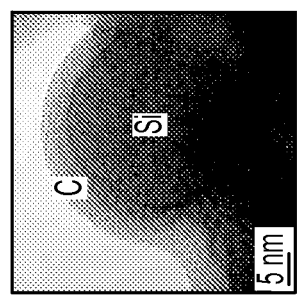
Figure 5C:
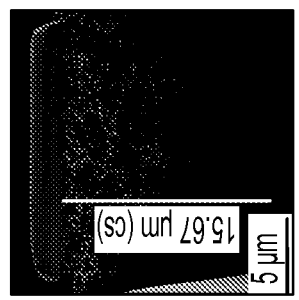
Figure 5D:
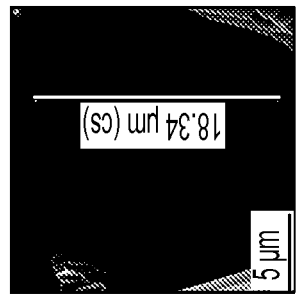
Figure 5H:
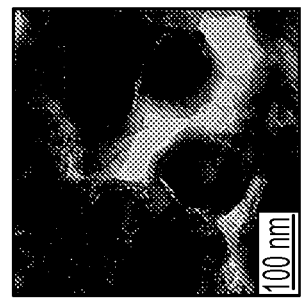
Figure 5G:
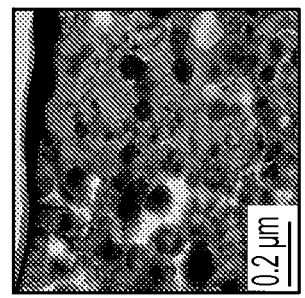
Figure 5F:
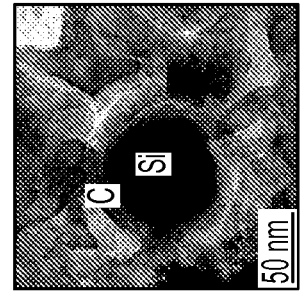
Figure 5E:
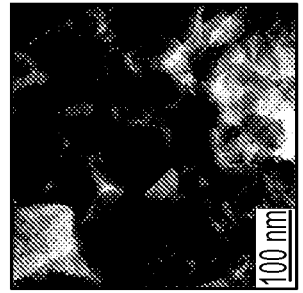

Further, we note EELS and TEM reveal a thin, conformal coating of PAN on the nano-Si particles throughout the uncycled composite (FIGS. 5(A) and 5(B)). The mechanical advantages of the cPAN coating are verified by analyzing electrode cross-sections at different stages of cycle life, finding an overall electrode volumetric expansion of only 40% after full initial lithiation with an EC/DEC (1M $LiPF_6$) electrolyte. Through the same treatment of electrode cross-section samples taken before (FIG. 5(C)) and after (FIG. 5(D)) initial lithiation in a $PYR_{13}FSI$ (1.2M LiFSI) electrolyte, we find the volumetric expansion of the nSi-cPAN composite to be just 17%. To further investigate this unexpected volume control, TEM micrographs were taken upon initial lithiation (FIGS. 5(E) and 5(F)) and after the $16^{th}$ delithiation (FIGS. 5(G) and 5(H)). The TEM images of both the fully lithiated and cycled electrodes show no mechanical deficiencies or morphological changes within the Si particles or the composite structure. Most notably, after the $16^{th}$ delithiation the $Si$-$PYR_{13}FSI$ system exhibits no severance of connection between the Si particles and cPAN network with striking preservation of the nano-Si's spherical shape, contrasting the relatively poor nano-structural preservation of the same electrode in conventional electrolyte. The impressive structural integrity of the nano-Si—$PYR_{13}FSI$ system is undoubtedly linked to the system's cycling stability, suggesting that the nano-Si-RTIL interface concurrently promotes favorable electrochemistry and structural resilience.

As previously mentioned, the goal of much electrochemical materials research is to incorporate high capacity electrodes into a lithium-ion full-cell. Up to this point in our study, we have provided in-depth characterization of the nano-Si—$PYR_{13}FSI$ system and proposed a mechanism for the system's stability through an unexpectedly robust SEI. The most dependable means of substantiating our claim of a stable SEI is to demonstrate the long-term cycling of a full-cell incorporating the nano-Si—$PYR_{13}FSI$ system. To this end, we have built nSi-cPAN/$PYR_{13}FSI$ (1.2M LiFSI)/ L333 LIBs capable of maintaining high energy-densities for an exceptionally long cycling life (see below for details on full-cell fabrication).

Figure 6A:
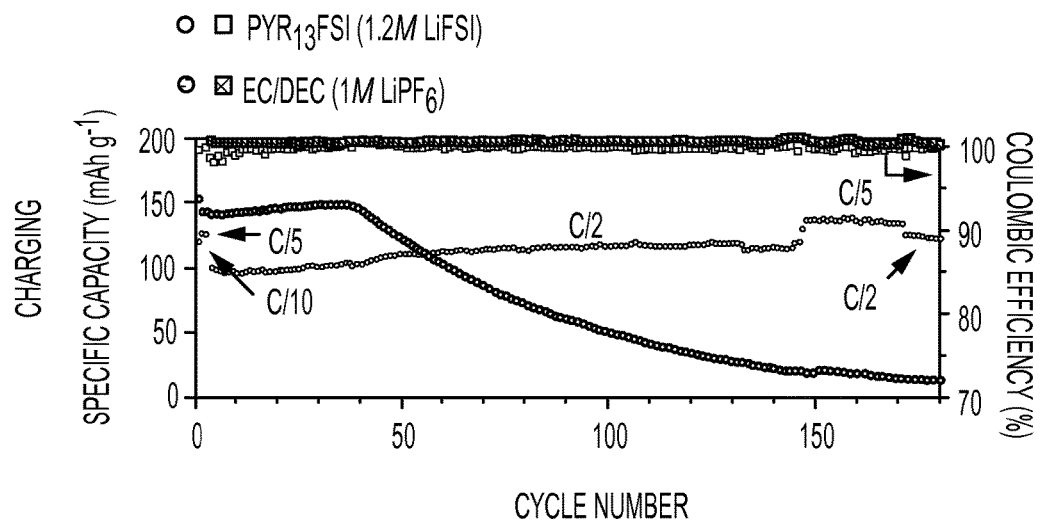
FIG. 6(A) shows charge capacities and coulombic efficiencies of nSi-PAN/L333 full-cells assembled with $PYR_{13}FSI$ (1.2M LiFSI) and conventional EC/DEC (1M $LiPF_6$) electrolytes.
Figure 6B:
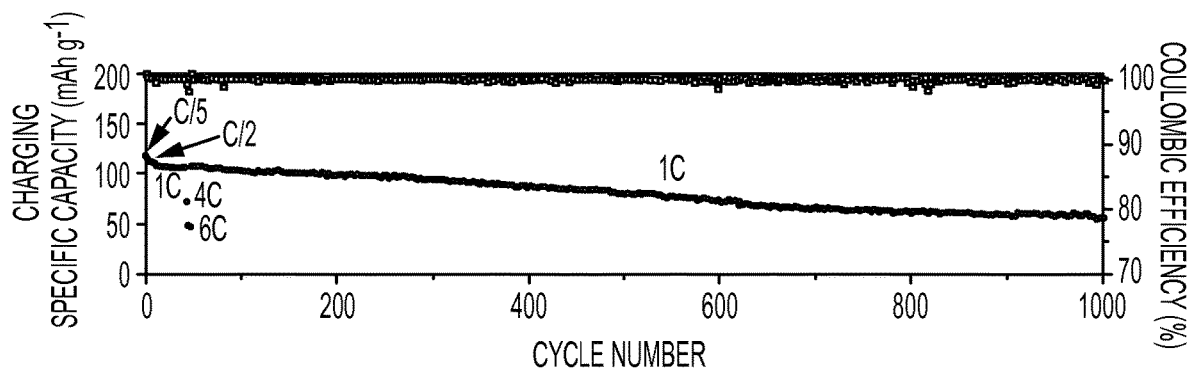
FIG. 6(B) shows results of a nSi-cPAN/$PYR_{13}FSI$/L333 full-cell rate study and long term cycling.

FIG. 6(A) compares the performance of nSi-cPAN/L333 full-cells assembled with conventional EC/DEC (1M $LiPF_6$) and $PYR_{13}FSI$ (1.2M LiFSI) electrolytes. Both cells presented in FIG. 6(A) contain the same electrode mass loading on both cathode and anode (within 10%) and were operated and controlled under the same parameters for fair comparison. Initial charge capacities of 143.21 mAh $g^{-1}$ and 127.10 mAh $g^{-1}$ (all full-cell specific capacities are normalized with respect to total active material mass) were observed at the C/5 rate for the EC/DEC (1M $LiPF_6$) and $PYR_{13}FSI$ (1.2M LiFSI) LIBs, respectively. The difference in initial capacity is attributed to the higher resistance of the RTIL electrolyte, though this limitation is countered by unparalleled cycling stability. After 35 cycles, the cell cycled in carbonate-based electrolyte degrades rapidly. The degradation, ascribed to low half-cell CEs and an average irreversible charge loss of 2.31% per cycle, occurs as the system exhausts its supply of Li through continuous SEI breaking and reformation. Contrastingly, the cell cycled in $PYR_{13}FSI$ (1.2M LiFSI) electrolyte shows unexpected stability with an average irreversible charge loss of just 0.076% for the first 100 cycles followed by negligible Li consumption, providing an average charge capacity of 110.98 mAh $g^{-1}$ at a rate of C/2. To further investigate the SEI stability of the nano-Si—$PYR_{13}FSI$ system, a full-cell was cycled for longevity with a brief rate study. FIG. 6(B) depicts the nSi-cPAN/$PYR_{13}FSI$ (1.2M LiFSI)/L333 cell run for 1000 cycles delivering 107.33, 74.70, and 58.26 mAh $g^{-1}$ at rates of 1C, 4C, and 6C, respectively.

Figure 6C:
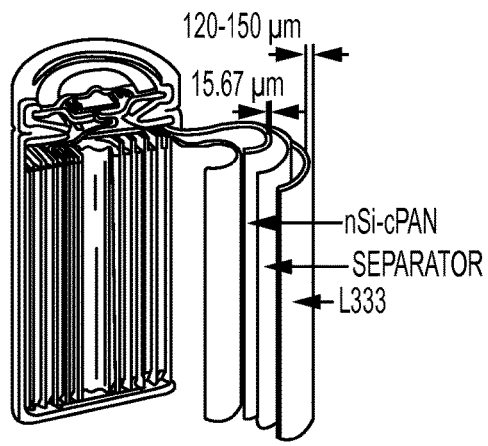
FIG. 6(C) shows a mock-up of a commercial 18650 cell showing the opportunity for incorporating more electroactive material due to the relatively thin nSi-cPAN electrode.
Figure 11:
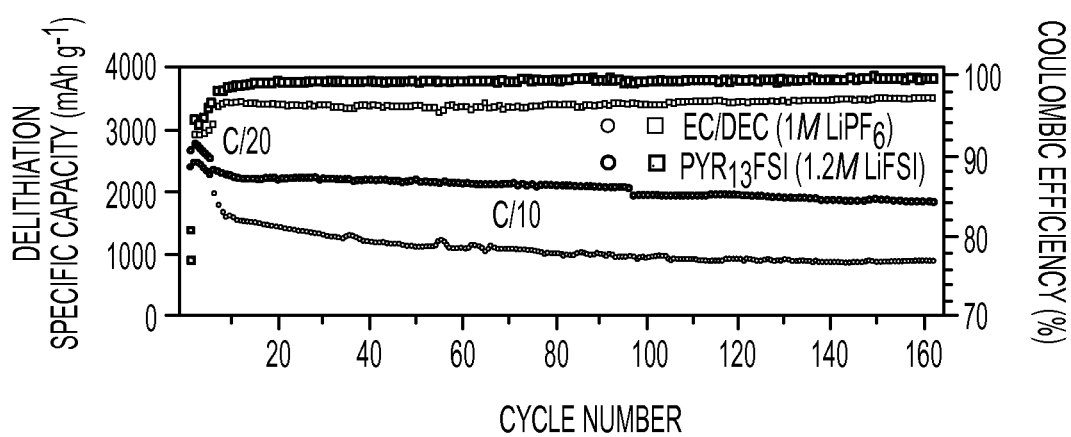
FIG. 11 shows half-cell electrochemical performance of a conventional Si-based electrode with $PYR_{13}FSI$ versus EC/DEC electrolyte systems.

It is noted that the $PYR_{13}FSI$ RTIL strengthens the performance of a range of previously developed Si-based anode architectures, not just those containing PAN (FIG. 11). Moreover, preliminary study of the high-temperature performance of the nano-Si-RTIL system has also yielded promising results (FIG. 12), suggesting that the SEI formed by $PYR_{13}FSI$ is stable even at elevated temperature. It is understood that the overall energy-density of LIBs is limited by the capacity of the positive electrode. This study demonstrates advancement in the study of LIB anode materials. We propose that introducing the nano-Si—$PYR_{13}FSI$ system into a commercial 18650 cell configuration, as shown in FIG. 6(C), would allow for incorporation of more electroactive material due to the relatively thin nSi-cPAN electrode. Based on a commercial battery with a 2 mAh $cm^{-2}$ areal capacity, utilizing the nSi-cPAN electrode, which is less than ¼ the thickness of a conventional graphite electrode, would allow for a much higher energy-density LIB. Validated by cycling data and a combination of theoretical and experimental results, our approach to developing a stable high energy-density anode-electrolyte system represents important progress towards a safer, higher-performance secondary LIB.

Methods

Electrode and Electrolyte Preparation nSi-cPAN and $Li(Ni_{1/3}Mn_{1-3}Co_{1/3})O_2$ electrodes were fabricated according to our procedures. Active material mass loading on both cathode and anode is at least double that of some previous work. Ionic liquid electrolytes were provided by Boulder Ionics Corporation (U.S.A.) and scanned for halide impurities. Impurities ($F^-$, $Cl^-$, $Br^-$, $SO_4^-$) were quantified using a Dionex ICS-1100 chromatograph, calibrated for sensitivities as low as 1 ppm. Ion chromatography was performed on all ionic liquids and lithium salts used in this work, and the total impurity content of every solution was calculated based off the mass percentage of electrolyte component in the total mass of electrolyte. The solutions contained less than 20 ppm (w/w) of moisture and less than 10 ppm (w/w) of halide and metal-ion impurities. 1M $LiPF_6$ in ethylene carbonate:diethyl carbonate (50:50, Soulbrain) was used as a conventional organic electrolyte.

Electrochemical Characterization

Electrochemical measurements were carried out using an Arbin™ BT2000 battery test station. All half-cells were assembled using our prepared nSi-cPAN electrodes as the working electrode and lithium metal foil as the counter electrode. The separator was a glass micro-fiber disk (Whatman™ GF/F) and the shell was a stainless steel CR2032 coin cell (Pred Materials). The electrolyte systems utilized were EC/DEC (1M LiPF$_6$), PYR$_{13}$FSI (1.2M LiFSI), PYR$_{13}$TFSI (0.6M LiTFSI), and EMIMFSI (1.2M LiFSI). We used a constant current (CC) testing scheme to cycle our half-cells. No holds were utilized during cycling to highlight the true performance of the cells' coulombic efficiencies. The half-cells were discharged (lithiated) and charged (delithiated) with various cycling currents (where a C/10 rate is equivalent to 353.6 $\mu$A cm$^{-2}$) between 0.05 and IV (vs. Li/Li$^+$). Electrochemical measurements of half-cells were all normalized based on the mass of Si active material in each electrode (typically 1.1-1.3 mg). We used a constant current constant voltage (CCCV) testing scheme to cycle our full-cells. The full-cells were discharged and charged with various cycling currents (where a C/2 rate is equivalent to 502.9 $\mu$A cm$^{-2}$ for the full-cells in FIG. 6(A) and 197.3 $\mu$A cm$^{-2}$ for the full-cell in FIG. 6(B)) between 2 and 4.15V (vs. Li/Li$^+$). Electrochemical measurements of full-cells were all (n)ormalized with respect to total mass of electro-active material in both cathode and anode electrodes (typically 7-9 mg).

Electronic Structure Calculations

Two types of calculations were conducted as mentioned above. A detailed description of both the static cluster-based calculation and ab initio molecular dynamics (AIMD) simulations with a Li$_{13}$S$_4$ slab is also included.

Morphological Characterization

FIB (FEI, NOVA200 dual beam system) equipped with a mobile air-lock chamber was used for TEM sample preparation. TEM and EELS analysis were performed with a FEI Tecnai F20 operated at 200 keV.

Electrochemical Quartz Crystal Microbalance

Similar to the electrode preparation for the coin-cell testing, nSi-cPAN films were coated on 1 in. diameter Pt 5 MHz resonating quartz crystals (Stanford Research Systems; SRS). The electrochemically active area in the cell was determined to be 1.359 cm$^2$, based on the Pt pattern on the crystal. In order to mitigate error associated with frequency measurements using thick films on quartz crystals, all nSi-cPAN films were prepared with thicknesses under 10 $\mu$m. The crystals were placed in a SRS QCM200 crystal holder. The holder was modified with PEEK insulation so that a standalone cell, with a volume of 2.5 mL, could be enclosed with a lid. The ceiling of the cell was lined with a Li foil counter electrode and connected to a copper wire. All current and potential parameters were consistent with the electrochemical characterizations of the coin-cells.

Full-Cell Fabrication

Full-cells were fabricated from pre-conditioned electrodes selected based on deliverable capacity. Calculated from the active material mass, nSi-cPAN anodes were fabricated and matched with L333 cathodes such that the total anode capacity was approximately 160% of that of the cathode capacity. Both electrodes were then pre-conditioned: the anodes were allowed to run for 10 charge-discharge cycles in a half-cell configuration and were stopped after full lithiation, while the cathodes were allowed to run for 3 charge-discharge cycles in a half-cell configuration and were stopped after full delithiation. The half-cells were then disassembled and the electrodes were used to fabricate 2032 coin-cell (Al-clad cathode cup) type full-cells. This method of pre-conditioning allows for full control of the amount of lithium in the system.

Modeling Study 1: Single-Electron Reductions of FSI and TFSI in Bulk Liquid Electrolyte FIG. 8 shows Single-Electron Reductions of FSI$^-$ and TFSI$^-$ anions. FIG. (A) shows Li$^+$ (TFSI$^-$)$_2$. FIG. (B) shows adding an excess electron to (A) spontaneously decomposes a resulting FSI$^-$ radical di-anion. FIG. (C) shows Li$^+$ (TFSI$^-$)$_2$. FIG. (D) shows adding an electron to (C) decomposes the resulting TFSI$^-$ di-anion.

Figure 8A:
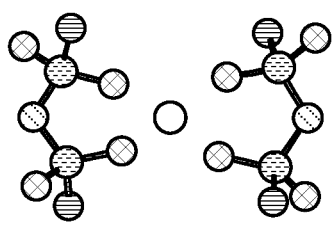
FIGS. 8(A), 8(B), 8(C), and 8(D) show single-electron reductions of $FSI^-$ and $TFSI^-$ anions.
Figure 8B:
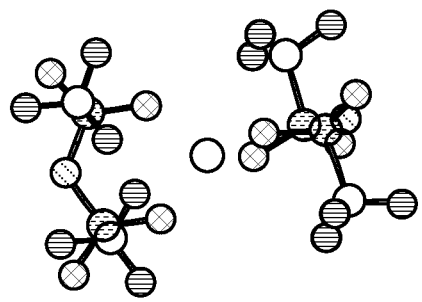
Figure 8C:
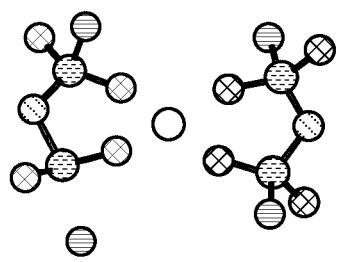
Figure 8D:
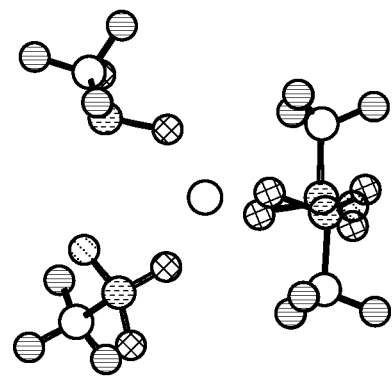
Figure 9A:
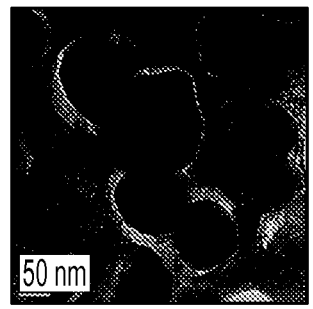
FIGS. 9(A), 9(B), 9(C), 9(D), and 9(E) images of a cross-section of solid-electrolyte interphase composition of a cycled conventional Si-based electrode.
Figure 9B:
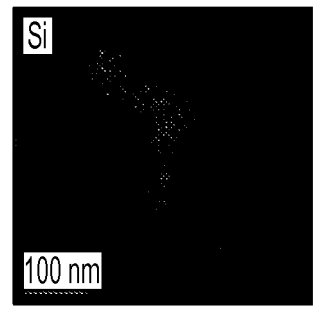
Figure 9C:
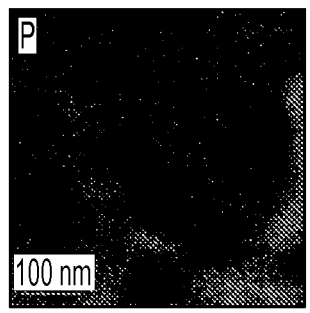
Figure 9D:
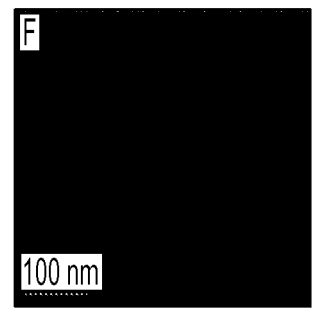
Figure 9E:
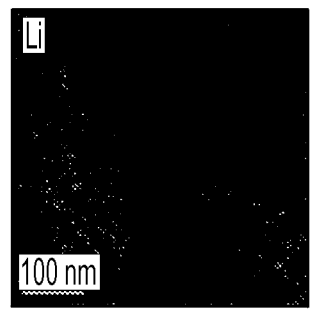

The first type of theoretical study consists of cluster-based, localized basis calculations on isolated FSI$^-$ (FIG. 8(A)) and TSFI$^-$ (FIG. 8(B)) anions coordinated to Li$^+$ and "solvated" in a dielectric continuum which approximates the effect of the ionic liquid around them. These mimic one-electron reduction pathway(s) in bulk liquid electrolyte, which should occur when the electron transfer rate is slowed by the initial SEI formation. Adding an excess electron to the dielectrically solvated Li$^+$ (FSI$^-$)$_2$ cluster spontaneously leads to the loss of F$^-$ from the resulting FSI$^{2-}$ radical di-anion in geometry optimization calculations (FIG. 8(C)). Injecting an e$^-$ into Li$^+$ (TFSI$^-$)$_2$ and performing geometry optimization decomposes the resulting TFSI$^{2-}$, yielding the two fragments shown in FIG. 9(d): SO$_2$CF$_3^-$ and NSO$_2$CF$_3^-$. The latter is a radical anion. Our predictions for TFSI$^-$ agree with the calculations performed on an isolated TFSI$^-$ without Li$^+$. The predictions are similar when the hybrid PBE0 functional is used. Two FSI$^-$ or TFSI$^-$ are used in these calculations to give 4-coordinated Li$^+$. Adding one excess electron to Li$^+$FSI$^-$ or Li$^+$TFSI$^-$ clusters leads to the unphysical reduction of the under-coordinated Li$^+$ to Li$^0$. Note: The above are single-excess-electron based, static calculations that are agnostic about reaction kinetics or electron transfer rates.

FIG. 9 shows solid-electrolyte interphase composition of a cycled conventional Si-based electrode. Cross-section of an electrode composed of active material (Si, 50 nm Alfa Aesar), conductive additive (acetylene black, AB), and binder (polyvinylidene difluoride, PVDF) in 60:20:20 ratio, respectively, and cycled from 0.05-1 V (vs. Li/Li$^+$) with EC/DEC (1M LiPF$_6$) electrolytes. FIG. 9(A) shows TEM micrograph of 20th delithiated cycled conventional Si-based electrode section along with EELS elemental mapping of (B), silicon, (C), phosphorous, (D), fluorine, and (E), lithium, defining the probable elemental constitution of the SEI formed and showing no preferential adherence onto the Si particles.

Electronic Structure Calculation Methods

Two types of calculations were conducted. Static cluster-based calculations, with a Li$^+$ and two FSI$^-$ or TFSI$^-$ anions, were performed using the Gaussian suite of programs, both the PBE and PBE0 functionals, a basis 6-31+G(d,p) for optimization, and the SMD dielectric continuum approximation with the dielectric constant, $\in$, set to 40. One excess electron is added in these calculations, so that the clusters exhibit a net charge of $-2|e|$ and a net spin.

Ab initio molecular dyamics (AIMD) simulations with a Li$_{13}$Si$_4$ slab and an anion were conducted using the VASP code version 4.6, PAW pseudopotentials, and are based on spin-polarized DFT/PBE calculations. The dimensions of the simulation cell are 15.84×34.00×13.32 $A^3$ with the (010) surface exposed; 2×1×2 Monkhorst-Pack Brillouin sampling, 400 eV cutoff for wavefunctions, 1-fs time steps, and a $10^{-6}$ eV energy convergence criterion per time step. The protons are given tritium masses and a Nose thermostat maintains the simulation temperature at T=350 K. As such, the timescales reported are approximate and not directly comparable to measurements. Ion pairs of $Pyr_{13}^+/FSI^-$ and $Pyr_{13}^+/TFSI^-$ are first optimized on the $Li_{13}Si_4$ (010) surface. While the potential ("voltage") associated with such calculations are not transparently deduced the decomposition mechanism is general invariant over large voltage windows.

Figure 10A:
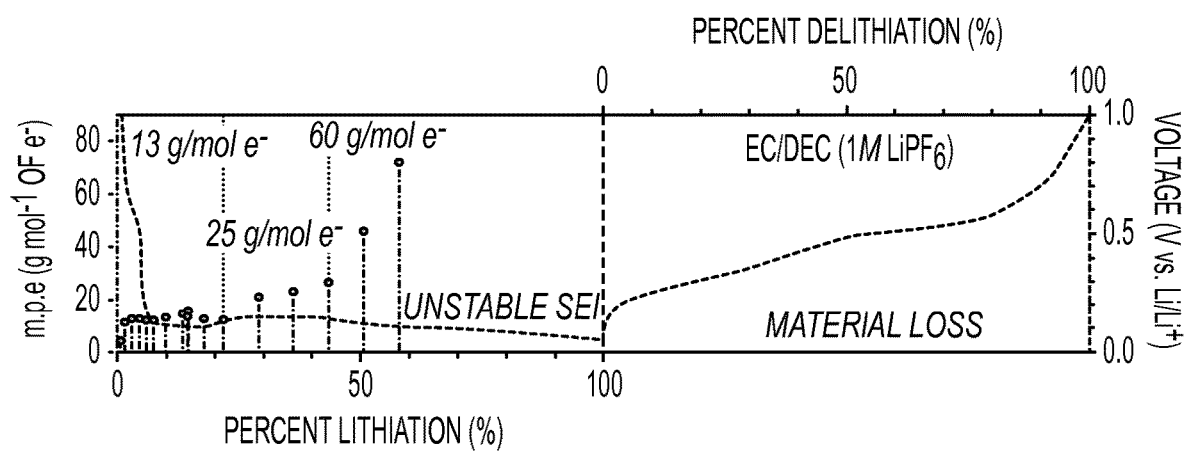
FIGS. 10(A) and 10(B) show mass change per electron for different electrodes during the first charge-discharge cycle
Figure 10B:
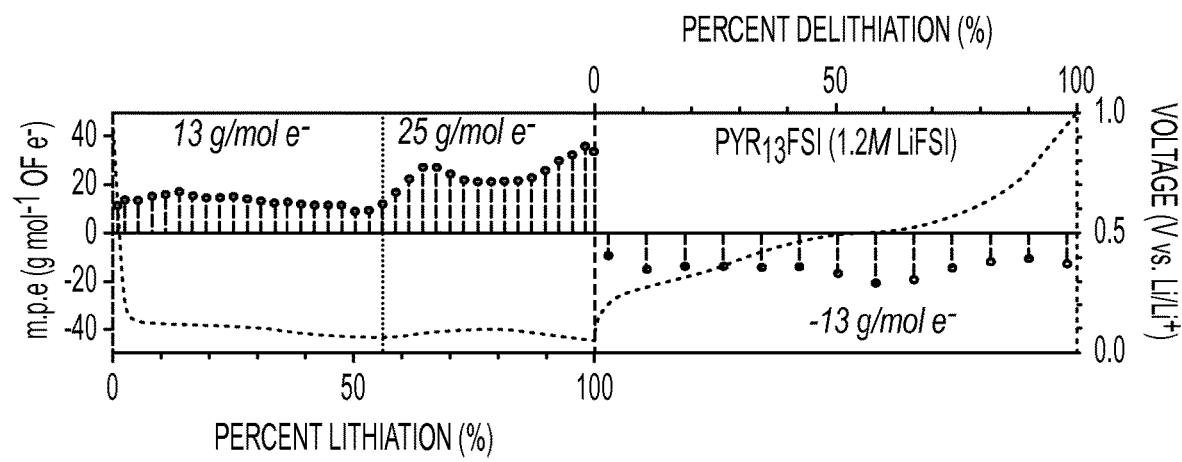

FIG. 10 shows EQCM m.p.e. data obtained during the initial SEI formation cycle for the nSi-cPAN electrodes cycled in A, conventional organic electrolyte and B, $PYR_{13}FSI$ (1.2M LiFSI) electrolyte, along with the voltage traces corresponding to each system. The m.p.e. data has been segmented (grey dotted lines) between points of onset of different rates of mass change and these average values are depicted within each system's plot. Initial average m.p.e. values observed for both conventional electrolyte and FSI-based IL, 13 g $mol^{-1}$ of $e^-$, is attributed to $Li^+$ uptake by cPAN, other non-faradaic processes, and initial alloying of Li and Si. After this initial state the difference in m.p.e. values between both systems are true to each system's ability to lithiate-delithiate the nSi-cPAN electrodes and form a stable interfacial layer. Of note is the average 25 g $mol^{-1}$ $e^-$ m.p.e. found in the lower voltage region of the discharge trace in RTIL electrolyte, corresponding well with the formation of LiF compounds.

Electrochemical Quartz Crystal Microbalance (EQCM): Potential Overshoot and Mass Per Mole of Electron (m.p.e.) Analysis The mentioned "potential overshoot" phenomenon has been observed in previous studies using both organic and IL based electrolytes in coin-cell and EQCM flooded cell set-ups. It has been seen on vapor deposited $SiO_x$ films as well as on amorphous SiO slurries imbedded within a polymer matrix. The overshoot is generally attributed to nucleation of $Li_2O$ and other decomposition products as the native oxide on the silicon film is reduced as in Equation S1.

$$SiO_x + 2xLi^+ + 2xe^- \rightarrow xLi_2O + Si \quad (S1)$$

As alluded to in the main text, m.p.e. values can be used to infer reaction products being adsorbed on the electrode. The following analysis offers a tentative explanation of the mechanistic aspects of our EQCM experiments and the m.p.e. data. The m.p.e. values are calculated by dividing the mass increase by the passed charge and multiplying by Faraday's constant. The m.p.e. values plotted in FIG. 10 are averages taken periodically over the course of the SEI formation steps. In the case of an already oxidized Si surface, reduction by Li would give a m.p.e. of 6.9 g $mol^{-1}$ $e^-$ (that of pure Li deposition or insertion). If the oxygen is pulled from the solvent, the overall m.p.e. would be 14.9 g $mol^{-1}$ $e^-$ (molecular weight of $Li_2O$ divided by 2 moles of electrons). For the organic electrolyte the overshoot at 20% lithiation, observed as a significant increase in potential in the voltage trace, gives rise to an even more rapid spike in m.p.e. until certain stresses in the system cause a sudden drop in mass around 58% lithiation. The m.p.e. values for the organic run suggest that as the potential is driven more negative the decomposition pathways move from $Li_2O$ formation to ethylene carbonate adsorption and decomposition, and finally to decomposition of phosphorous and fluoride species from $LiPF_6$.

The potential overshoot that correlated with $Li_2O$ formation for the RTIL electrolyte was a much smaller overshoot, if indeed an overshoot is present at around 0.12 V, than that observed when the potential reached 0.06 V. At this point, a significant rise in the potential also saw a rise in the mass gain slope (i.e., m.p.e. values). Just prior to the rise, m.p.e. values hovered around or below 9 g $mol^{-1}$ $e^-$. Subsequently, the m.p.e. values rose toward, and leveled off around, 25 g $mol^{-1}$ $e^-$ suggesting, nucleation of LiF. This supports the EELS measurements as well as the computational simulations which suggest the S—F bond is the first to be cleaved as $FSI^-$ undergoes decomposition. It also supports our modeling study. A small dip down to about 20 g $mol^{-1}$ $e^-$ likely indicates a weighted average of LiF as well as lighter products like LiOH, and perhaps more $Li_2O$. Finally, toward the end of the SEI formation step, m.p.e. values climbed no higher than 33 g $mol^{-1}$ $e^-$ possibly indicating the incorporation of S containing decomposition fragments. This would make sense, considering these fragments are thought to be the final decomposition products remaining when $FSI^-$ reacts with Li.

FIG. 11 shows half-cell electrochemical performance of a conventional Si-based electrode with $PYR_{13}FSI$ versus EC/DEC electrolyte systems. An electrode composed of active material (Si, 50 nm Alfa Aesar), conductive additive (acetylene black, AB), and binder (polyvinylidene difluoride, PVDF) in 60:20:20 ratio, respectively, is heat treated at 300° C. (for improved performance of PVDF binder) and cycled from 0.05-1 V (vs. $Li/Li^+$) with EC/DEC (1M $LiPF_6$), black profile, and $PYR_{13}FSI$ (1.2M LiFSI), orange profile electrolytes. Consistent with the results found with the nSi-cPAN/$PYR_{13}FSI$ system, a faster capacity stability is observed, with an average stable charge capacity of 2065.77 mAh $g^{-1}$ for 160 cycles along with an average CE of 99.377% for the conventional Si-based electrodes ran with $PYR_{13}FSI$ electrolyte. This compares with an average stable specific capacity of 1092.19 mAh $g^{-1}$ along with an average CE of 96.553% for the conventional Si anodes ran with EC/DEC electrolyte. The performance improvement and high CE achieved with $PYR_{13}FSI$ IL system is attributed to the stable SEI formed, which again shows to maintain high capacities suggesting electrode mechanical conservation throughout cycling.

Figure 12:
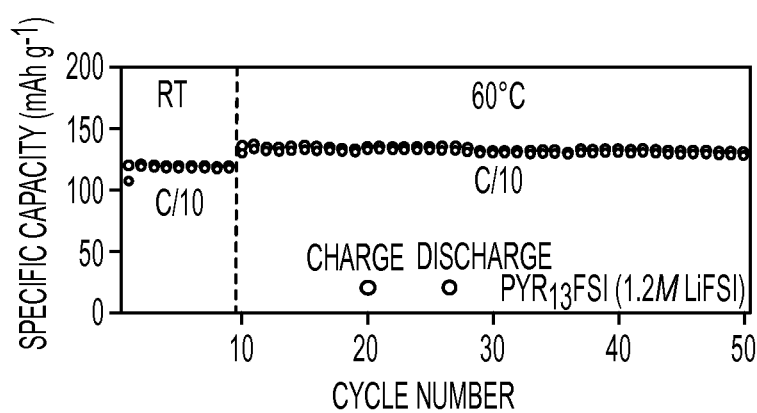
FIG. 12 shows high temperature electrochemical performance of a full-cell.

FIG. 12 shows high Temperature electrochemical performance of a nSi-cPAN/L333 full-cell with $PYR_{13}FSI$ RTIL. Specific charge capacities of a nSi-PAN/L333 full-cell assembled with $PYR_{13}FSI$ (1.2M LiFSI) and cycled at 60° C. The cell was cycled preconditioned for 9 cycles at room temperature (RT) and then taken up to 60° C. for subsequent cycles. This preliminary cycling data suggests SEI formed by $PYR_{13}FSI$ is stable even at elevated temperature.

In support of applying this system to other Si active materials, Si nanowires (SiNW synthesized by Ref., W. Want et al. Applied Surface Chemistry, 2012, 258, 8649) have been implemented. FIGS. 13 (A) and (B) provides the results for SiNW-cPAN in a half-cell configuration and in a full-cell configuration (L333 cathode) in $PYR_{13}FSI$ (1.2M LiFSI) and EC/DEC (1M $LiPF_6$) electrolyte systems similar to the data shown in FIG. 1(A) and FIG. 6(A) above.

Figure 13A:
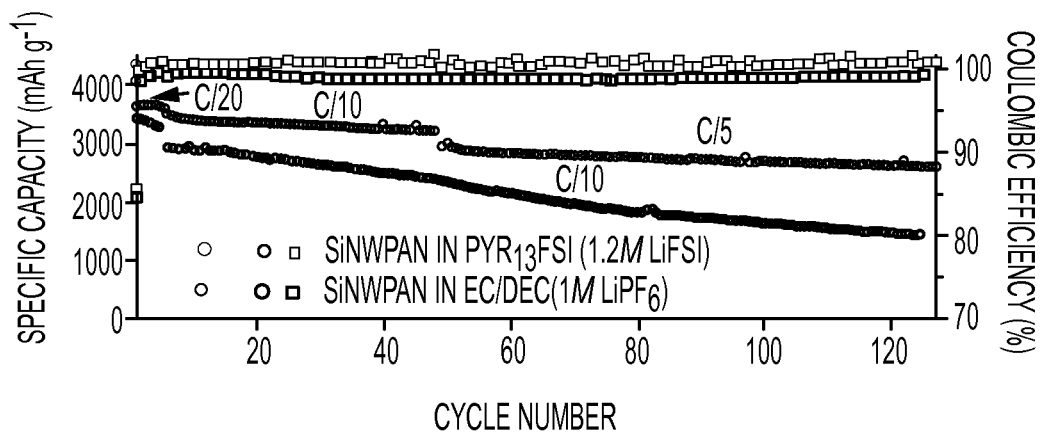
FIG. 13(A) shows capacity and coulombic efficiency of an electrode.
Figure 13B:
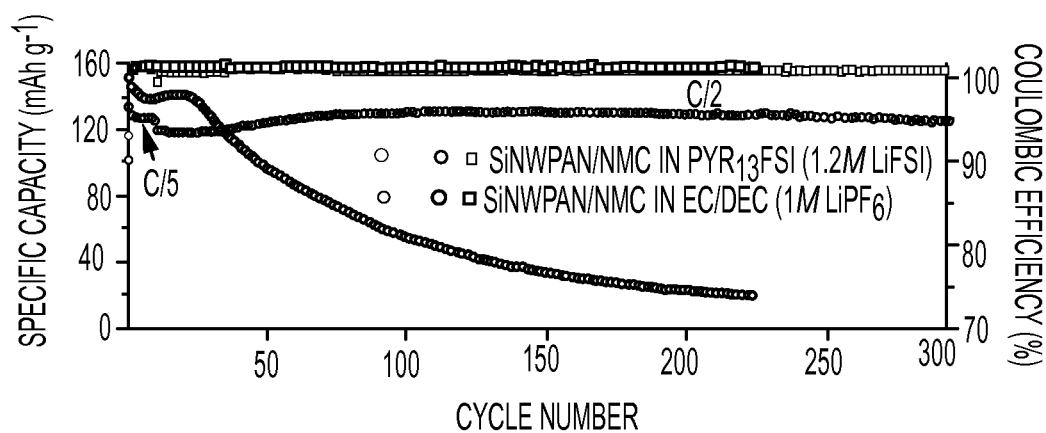
FIG. 13(B) shows capacity and coulombic efficiency of a full-cell.

FIG. 13(A) shows specific capacities and coulombic efficiencies of SiNW-cPAN electrode in $PYR_{13}FSI$ (1.2M LiFSI) and EC/DEC (1M $LiPF_6$). FIG. 13(B) shows specific charge capacities and coulombic efficiencies of nSi-PAN/

L333 full-cells assembled with PYR$_{13}$FSI (1.2M LiFSI) and conventional EC/DEC (1M LiPF$_6$) electrolytes. The full-cell assembled with PYR$_{13}$FSI (1.2M LiFSI) has a capacity retention with respect to the 2nd cycle of 100% at 200 cycles and of 97.5% at 300 cycles.

Figure 14:
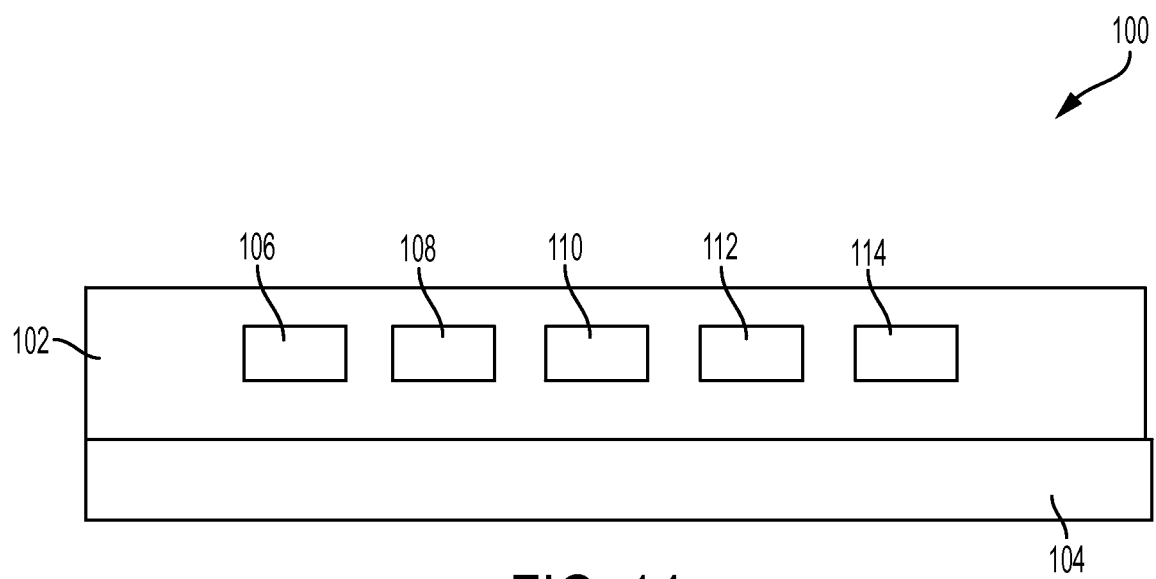
FIG. 14 shows an illustration of a composition of matter including a film formed on an electrode with the film including fluorine, oxygen, sulfur, carbon, and lithium.

FIG. 14. shows an illustration of a composition of matter 100 including a film 102 formed on an electrode 104, the film 102 includes fluorine 106, oxygen 108, sulfur 110, carbon 112, and lithium 114. The film 102 is formed on the electrode 104, for example, during the charging and discharging of a lithium-ion battery. In some embodiments the film 102 is a solid-electrolyte interphase film. A solid-electrolyte interphase (SEI) film is a film formed on the electrode surface (surface of all exposed particles, including those within the electrode) during electrochemical cycling. As the electrolyte in contact with the electrode surface breaks down (reductive decomposition), the break down products form a solid-electrolyte interphase film, which acts to passivate further reaction (reductive decomposition) while still allowing charge transfer. The film 102 is not limited to a particular thickness and may change thickness during charging and discharging of the lithium-ion battery. The electrode 104 includes a conductive material in which current may flow. An exemplary electrode 104 is an anode including nanosilicon and an electrochemically inactive polyacrylonitrile to bind the silicon. Another exemplary binder is polyvinylidene fluoride (PVDF).

Figure 15:
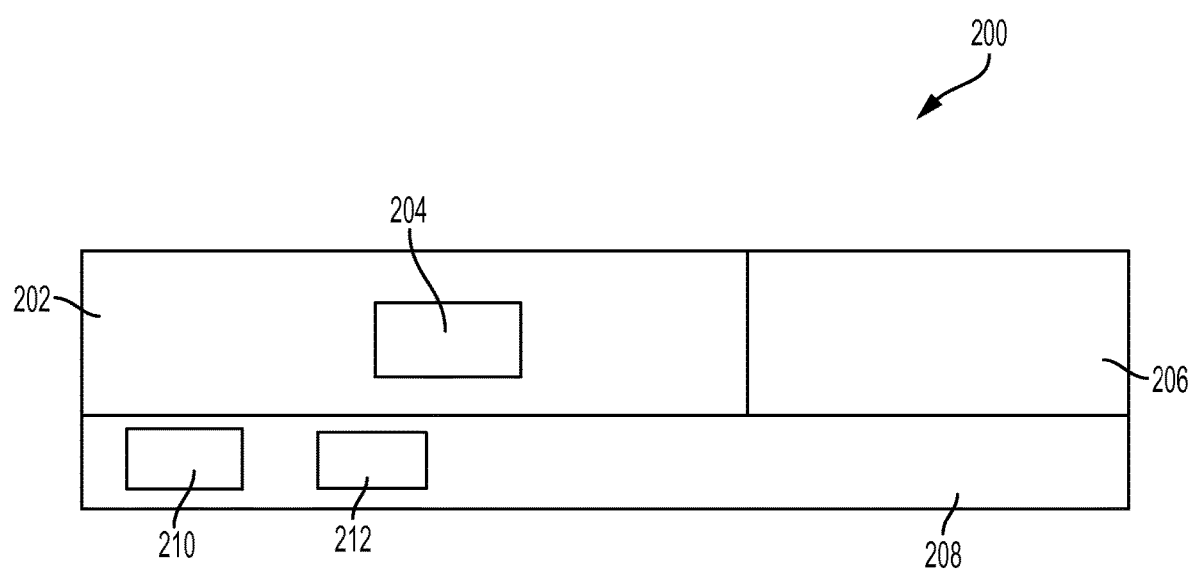
FIG. 15 shows an illustration of a substrate including an active material including nanosilicon, a polymer to bind the active material and to conduct electricity and an electrolyte to contact the polymer and the active material.

FIG. 15 shows an illustration of a substrate 200 including an active material 202 including nanosilicon 204, a polymer 206 to bind the active material 202 and to conduct electricity and an electrolyte 208 to contact the polymer 206 and the active material 202. The electrolyte 208 includes a salt 210 and an anion of the salt 212. The substrate 200 forms a base on which other materials may be deposited or formed. In some embodiments, the substrate 200 is an electrode including the active material 202. The active material 202, in some embodiments, includes material capable of conducting electricity. The active material 202 is a material that is electrochemically active. In operation, the active material 202 interacts with ions, such as Li ions, to store charge. In some embodiments, the active material includes nanosilicon. The active material 202 is not limited to a particular form. In some embodiments the active material 202 includes silicon nanowires. In some embodiments, nanowires have a diameter of between about 5 nanometers and about 20 nanometers. In some embodiments nanowires have a diameter of between about 20 nanometers and about 50 nanometers. And in some embodiments, nanowires have a diameter of between about 50 nanometers and about 100 nanometers. Silicon suitable for use in connection with the formation of the active material 202 is commercially available from Alfa Aesar. In some embodiments, the silicon 204, for example silicon particles, are coated in polyacrylonitrile during the electrode fabrication process. Thus, a "PAN coating" covers all silicon particles that make up the electrode.

Figure 16:
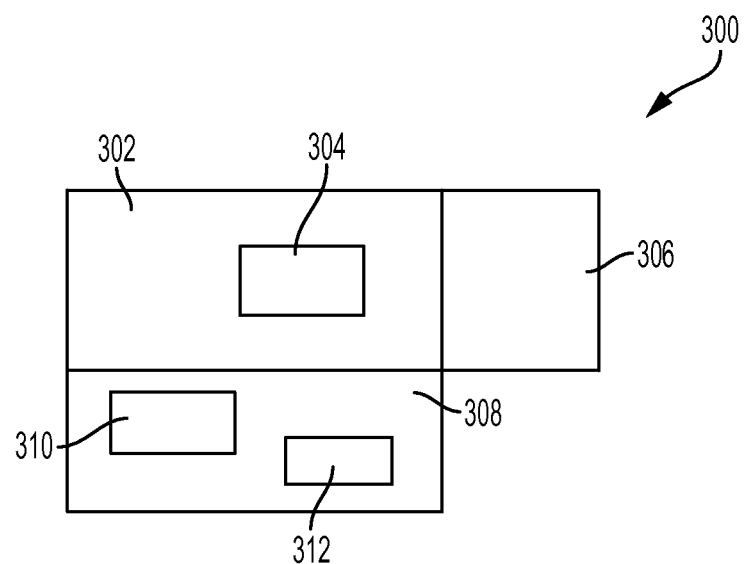
FIG. 16 shows an illustration of a substrate including an active material including nanosilicon, a polyacrylonitrile to bond the active material and to conduct electricity, and an electrolyte to contact the active material, the electrolyte including LiFSI salt and a bis(fluorosufonyl)imide (FSI$^-$) anion of the LiFSI salt.

FIG. 16 shows an illustration of a substrate 300 including an active material 302 including nanosilicon 304, a polyacrylonitrile 306 to bond the active material 302 and to conduct electricity, and an electrolyte 308 to contact the active material 302, the electrolyte 308 including LiFSI salt 310 and a bis(fluorosufonyl)imide (FSI$^-$) anion 312 of the LiFSI salt 310. In some embodiments, the polyacrylonitrile is a conductive agent. In addition to active material and binder, electrodes contain an electronically conductive material whose purpose is to allow fast transport of electrons between a current collector and active material. After heat treatment, PAN becomes electronically conductive, thus it may be used both as a binder and conductive agent. Other exemplary conductive agents include acetylene black (AB) and "Super-P" (another type of carbon black), and SFG-6 (graphite).

Figure 17:
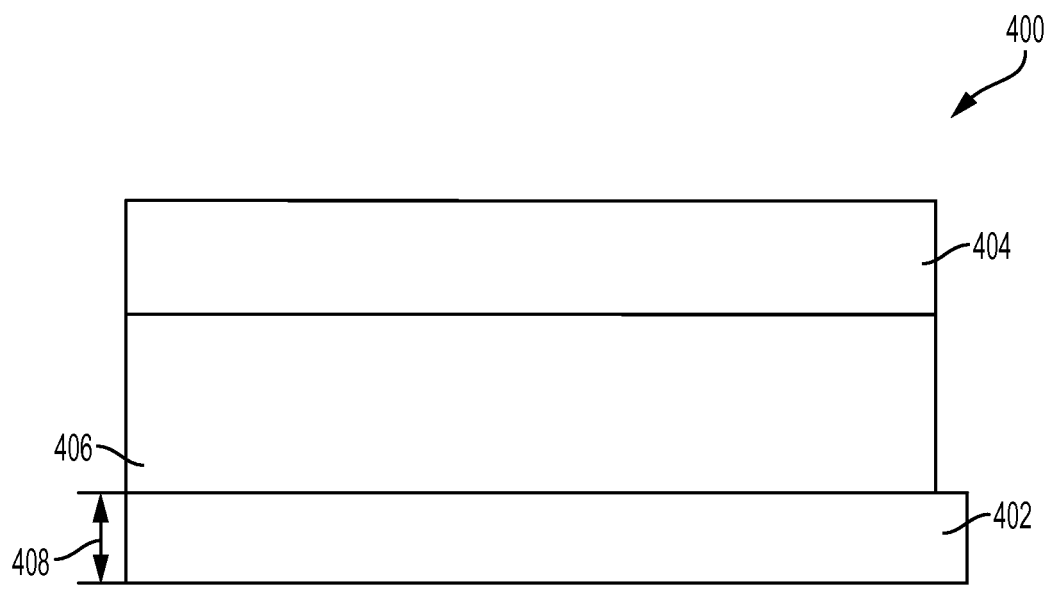
FIG. 17 shows a block diagram for an apparatus including a first electrode including nanosilicon, a second electrode, and a room temperature ionic liquid electrolyte to contact the first electrode and the second electrode.

FIG. 17 shows a block diagram for an apparatus 400 including a first electrode including nanosilicon 402, a second electrode 404, and a room temperature ionic liquid electrolyte 406 to contact the first electrode 402 and the second electrode 404. The room temperature ionic liquid electrolyte 406 is not limited to a particular material. Ionic liquid electrolytes are a class of electrolyte materials based on room temperature ionic liquids (RTILs). A room temperature ionic liquid electrolyte includes a RTIL and a salt. The ionic liquid electrolyte 406 is not an organic solvent based electrolyte. In some embodiments, the room temperature ionic liquid electrolyte 406 includes species selected from the group consisting of pyrrolidinium, 1-ethyl-3-methyl-imidazolium, bis(trifluoromethanesulfonyl)imide and bis(fluorosulfonyl)imide. In some embodiments the room temperature ionic liquid electrolyte 406 includes lithium bis(fluorosulfonyl)imide. In some embodiments, the room temperature ionic liquid electrolyte 406 has a 58.4 wt. % of the RTIL based on molecular weight of the ions. The salt is then added to this RTIL in a concentration of 1.2 M (or 1.2 mol/L, with LiFSI salt weighing in at 187.09 g/mol . . . so there are 224.508 g/L of salt in the electrolyte). The first electrode including silicon 402 can be formed from various materials. In some embodiments, the first electrode including nanosilicon 402 includes a cyclized-polyacrylonitrile silicon nanocomposite. In some embodiments, the first electrode includes a nSi-cPAN and the electrolytic material or more specifically the room temperature ionic liquid electrolyte 406 includes a PYR$_{13}$FSI (1.2M LiFSI) electrolyte. In some embodiments, the electrode 402 including nanosilicon 404 has a weight ratio of 30 wt. % PAN, 70 wt. % Silicon. The first electrode including nanosilicon 402 is not limited to a particular structure or thickness. In some embodiments, the first electrode including nanosilicon 402 comprises a bulk electrode. The thickness of a bulk electrode exceeds the thickness of a thin film electrode. In some embodiments, the bulk electrode has a thickness 408 of between about 10 micrometers and about 50 micrometers. In operation, the apparatus 400, in some embodiments including the bulk electrode maintains a half-cell coulombic efficiency of greater than about 99.994 percent over about 5000 cycles. In some embodiments, the first electrode including nanosilicon 406 includes a substantially mechanically stable solid electrolyte interphase film. A substantially mechanically stable solid electrolyte interphase film exhibits a substantially constant conductivity over several thousand charging and discharging cycles.

Figure 18:
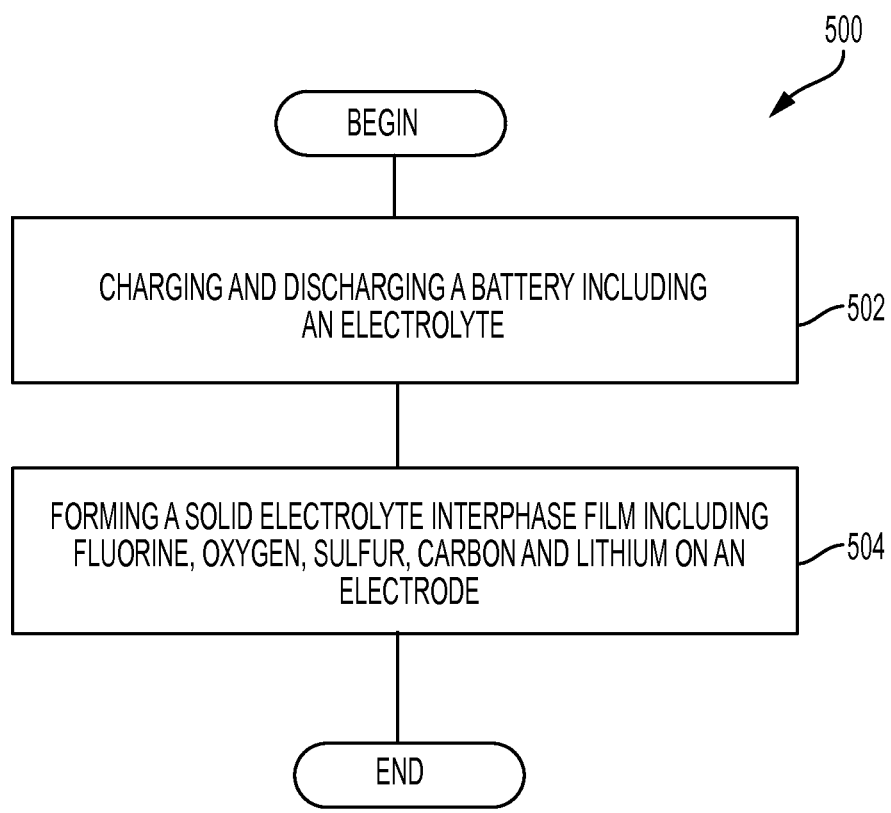
FIG. 18 shows a flow diagram illustrating a method including charging and discharging a battery including an electrolyte, and forming a solid electrolyte interphase film including fluorine, oxygen, sulfur, carbon, and lithium on an electrode.

FIG. 18 shows a flow diagram 500 illustrating a method including charging and discharging a battery including an electrolyte (block 502), and forming a solid electrolyte interphase film including fluorine, oxygen, sulfur, carbon, and lithium on an electrode (block 504).

Figure 19:
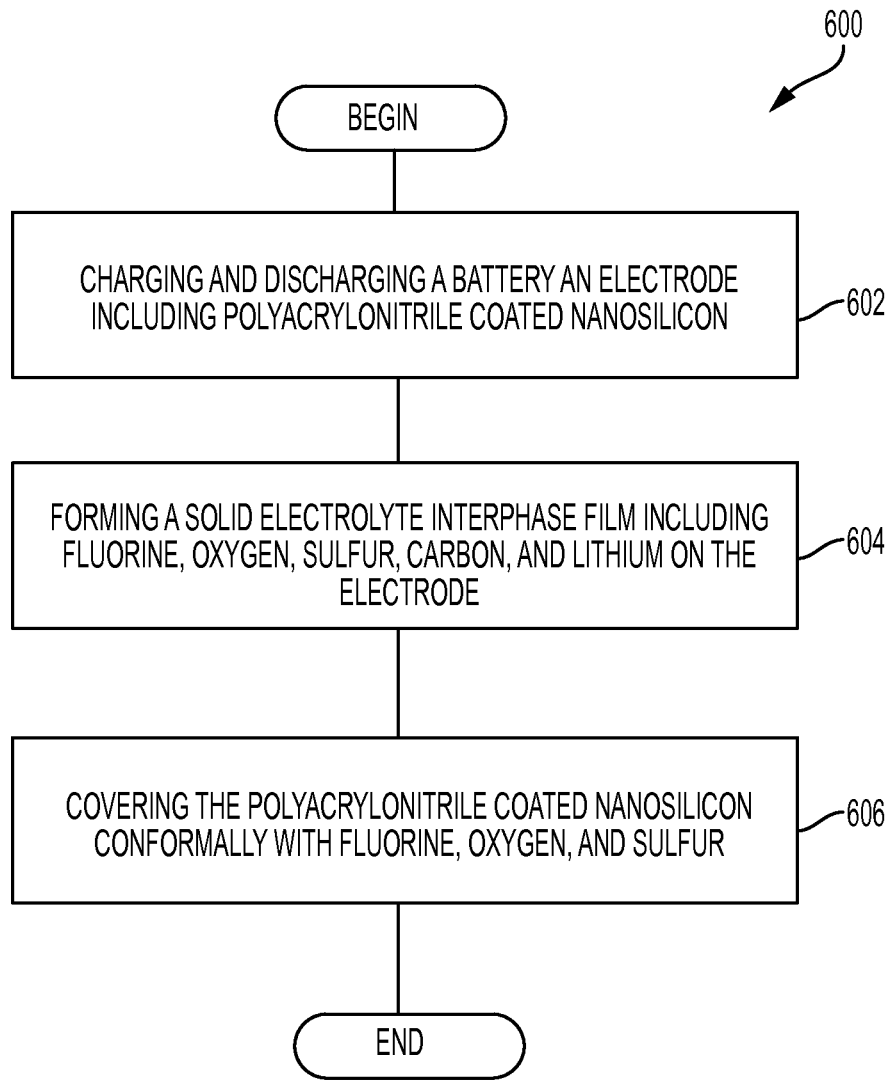
FIG. 19 shows a flow diagram of a method including charging and discharging a battery having an electrode including polyacrylonitrile coated nanosilicon, forming a solid electrolyte interphase film including fluorine, oxygen, sulfur, carbon, and lithium on the electrode, and covering the polyacrylonitrile coated conformally with fluorine, oxygen, and sulfur.

FIG. 19 shows a flow diagram of a method 600 including charging and discharging a battery having an electrode including polyacrylonitrile coated nano silicon (block 602), forming a solid electrolyte interphase film including fluorine, oxygen, sulfur, carbon, and lithium on the electrode (block 604), and covering the polyacrylonitrile coated nanosilicon conformally with fluorine, oxygen, and sulfur (block 606). In a conformal coating or covering, such as a polyacrylonitrile coating or covering, the polyacrylonitrile coats or covers all active material, such as nanosilicon or silicon particles, substantially equally and substantially uniformly to a thickness of about 5 nanometers.

Figure 20:
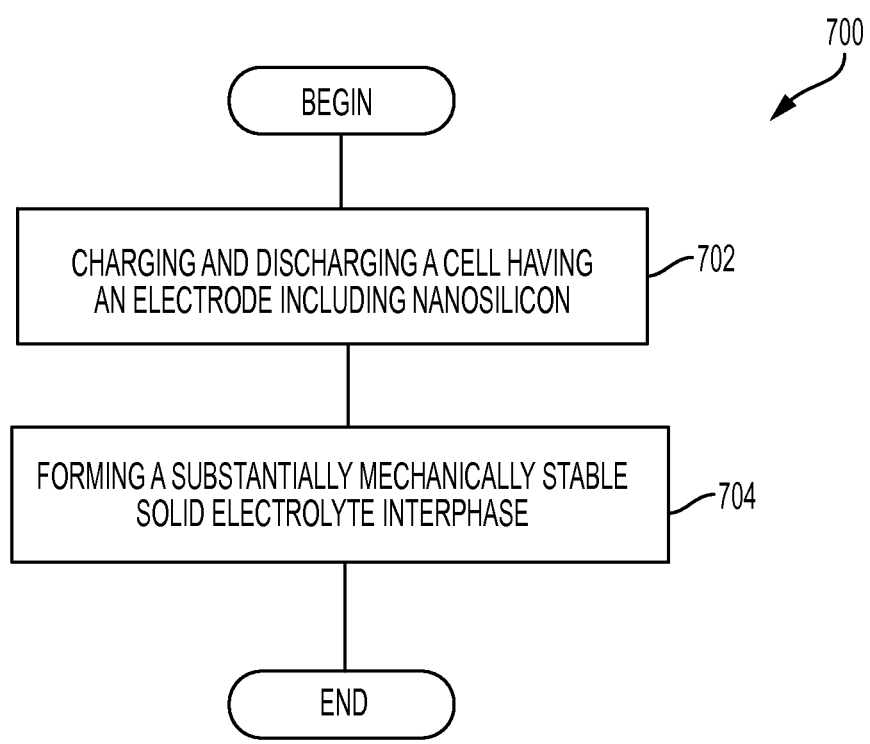
FIG. 20 shows a flow diagram of a method including charging and discharging a cell having an electrode including nanosilicon, and forming a substantially mechanically stable solid-electrolyte interphase at the electrode.

FIG. 20 shows a flow diagram of a method 700 including charging and discharging a cell having an electrode including nano silicon (block 702), and forming a substantially mechanically stable solid-electrolyte interphase at the electrode (block 704). In some embodiments, charging and discharging a cell including an electrode including nanosilicon includes charging and discharging the cell over at least about 5000 cycles. In some embodiments, the method 700 further includes maintaining a half-cell coulombic efficiency of greater than about 99.994 percent over the at least about 5000 cycles.

Figure 21:
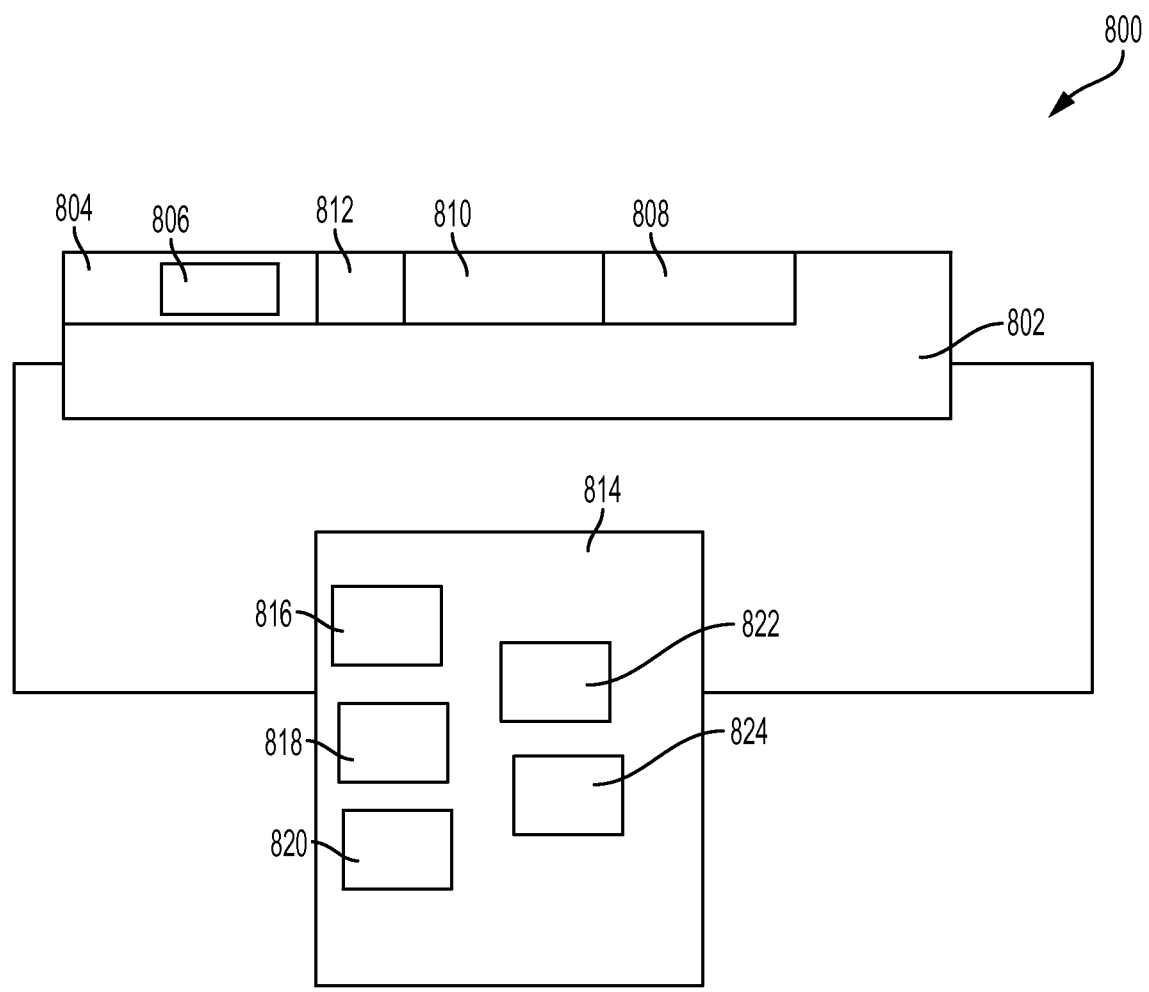
FIG. 21 shows a block diagram of a system including a plurality of electrically coupled cells including a first electrode including nanosilicon, a second electrode, and a room temperature ionic liquid electrolyte to contact the first electrode and the second electrode.

FIG. 21 shows a block diagram of a system 800 including a plurality of electrically coupled cells 802 including a first electrode 804 including nanosilicon 806, a second electrode 808, and a room temperature ionic liquid electrolyte 810 to contact the first electrode 804 and the second electrode 808, a film 812 formed on the first electrode 804, the film 812 including fluorine, oxygen, sulfur, carbon and lithium, and an electronic device 814 electrically coupled to the plurality of electrically coupled cells 802. The system 800 is not limited to use in connection with a particular electronic device 814. Exemplary electronic devices 814 suitable for use in connection with the system 800 include a processor 816, a motor 818, a turbine 820, a solar cell 822, and a transportation device 824. In some embodiments, the transportation device 824 includes a truck 826.

While apparatus and methods have been described in terms of several embodiments, those of ordinary skill in the art will recognize that the apparatus and methods are not limited to the embodiments described, but can be practiced with modification and alteration within the spirit and scope of the appended claims. The description is thus to be regarded as illustrative instead of limiting.

What is claimed is:

1. An electrical energy storage device comprising:
   an electrode system comprising:
      an active material comprising a plurality of nanosilicon particles; and
      a polyacrylonitrile polymer binding the active material and conducting electricity and lithium ions, wherein the polyacrylonitrile polymer conformally and individually coats each of the plurality of nanosilicon particles;
   a second electrode; and
   a room temperature ionic liquid electrolyte to contact the electrode system and the second electrode, wherein the room temperature ionic liquid electrolyte includes a positive ion species selected from the group consisting of pyrrolidinium and 1-ethyl-3-methyl-imidazolium.

2. The device of claim 1, wherein the electrode system comprises a cyclized-polyacrylonitrile silicon nanocomposite (nSi-cPAN).

3. The device of claim 1, wherein the electrode system comprises a nSi-cPAN and the room temperature ionic liquid electrolyte comprises a PYR13FSI.

4. The device of claim 3 wherein the electrode system comprises a bulk-type composite electrode.

5. The device of claim 4, wherein the bulk electrode has a thickness of greater than about 5 micrometers.

6. The device of claim 1, wherein the nanosilicon particles have a size in the range of from 1 to 500 nm.

7. The device of claim 1, wherein the electrode system comprises about 70 wt % nanosilicon particles and about 30 wt % polyacrylonitrile polymer.

8. The device of claim 1, wherein the electrode system has a thickness in the range of from 10 to 50 μm.

* * * * *